(12) United States Patent
Körner et al.

(10) Patent No.: US 10,066,997 B2
(45) Date of Patent: Sep. 4, 2018

(54) METHOD AND DEVICE FOR GENERATING MULTISPECTRAL OR HYPERSPECTRAL LIGHT, FOR HYPERSPECTRAL IMAGING AND/OR FOR DISTANCE MEASUREMENT AND/OR 2D OR 3D PROFILE MEASUREMENT OF AN OBJECT BY MEANS OF SPECTROMETRY

(71) Applicant: Universität Stuttgart, Stuttgart (DE)

(72) Inventors: Klaus Körner, Stuttgart (DE);
Wolfgang Osten, Stuttgart (DE);
Tobias Boettcher, Böblingen (DE);
Wolfram Lyda, Leonberg (DE); Marc Gronle, Stuttgart (DE)

(73) Assignee: Universität Stuttgart, Stuttgart (DE)

( * ) Notice: Subject to any disclaimer, the term of this patent is extended or adjusted under 35 U.S.C. 154(b) by 0 days.

(21) Appl. No.: 15/120,373

(22) PCT Filed: Feb. 17, 2015

(86) PCT No.: PCT/EP2015/000344
§ 371 (c)(1),
(2) Date: Aug. 19, 2016

(87) PCT Pub. No.: WO2015/124288
PCT Pub. Date: Aug. 27, 2015

(65) Prior Publication Data
US 2017/0059408 A1    Mar. 2, 2017

(30) Foreign Application Priority Data
Feb. 21, 2014    (DE) .................. 10 2014 002 514

(51) Int. Cl.
*G01N 21/25*    (2006.01)
*G01J 3/28*    (2006.01)
(Continued)

(52) U.S. Cl.
CPC ............ *G01J 3/2823* (2013.01); *G01B 11/14* (2013.01); *G01B 11/2441* (2013.01);
(Continued)

(58) Field of Classification Search
CPC ...... G01J 3/28; G01J 3/433; G01J 3/26; G01J 3/10; G01J 3/453; G01J 3/2823;
(Continued)

(56) References Cited

U.S. PATENT DOCUMENTS 5,433,197 A    7/1995 Stark
6,031,609 A    2/2000 Funk et al.
(Continued)

FOREIGN PATENT DOCUMENTS

DE    102006007172 A1    8/2007
WO    2010060460 A1    6/2010

OTHER PUBLICATIONS

Sep. 8, 2015—(PCT) International Search Report and Written Opinion—App PCT/EP2015/000344.
(Continued)

*Primary Examiner* — Jamil Ahmed
(74) *Attorney, Agent, or Firm* — Banner & Witcoff, Ltd.

(57) ABSTRACT

The invention relates to methods and to devices for generating multispectral illuminating light having an addressable spectrum, for adaptive multispectral imaging and for capturing structural and/or topographical information of an object or of the distance to an object. The illuminating device comprises a multispectral light source and a modulator for temporal modulation of the individual spectral components of the multispectral light source having modulation frequencies. The multispectral light source comprises at least one light source having a continuous, quasi-continuous, or frequency comb spectrum and wavelength-dispersive means, or an assembly or array of monochromatic or quasi-
(Continued)

monochromatic light sources having emission wavelengths or emission wavelength bands which are different from one another in each case. The modulator comprises at least one electrically controllable three-dimensional light modulator, or a plurality of electronic control modules assigned to the individual monochromatic or quasi-monochromatic light sources.

17 Claims, 8 Drawing Sheets

(51) Int. Cl.
  *G01J 3/10*   (2006.01)
  *G01J 3/433*   (2006.01)
  *G01B 11/25*   (2006.01)
  *G01J 3/02*   (2006.01)
  *G01B 11/14*   (2006.01)
  *G01B 11/24*   (2006.01)
  *G01J 3/26*   (2006.01)

(52) U.S. Cl.
  CPC ...... *G01B 11/2509* (2013.01); *G01B 11/2536* (2013.01); *G01J 3/0229* (2013.01); *G01J 3/10* (2013.01); *G01J 3/26* (2013.01); *G01J 3/4338* (2013.01); *G01J 2003/2826* (2013.01)

(58) Field of Classification Search
  CPC .................. G01J 3/0229; G01J 3/4338; G01J 2003/2826; G01B 11/04; G01B 11/14; G01B 11/24; G01B 11/2441; G01B 11/2509; G01B 11/2536
  See application file for complete search history.

(56) References Cited

U.S. PATENT DOCUMENTS

| | | | |
|---|---|---|---|
| 6,859,275 | B2 | 2/2005 | Fateley et al. |
| 8,014,569 | B2 | 9/2011 | Durkin et al. |
| 2002/0057431 | A1 | 5/2002 | Fateley et al. |
| 2005/0024640 | A1 | 2/2005 | Fateley et al. |
| 2005/0058352 | A1 | 3/2005 | Deliwala |
| 2005/0185179 | A1* | 8/2005 | Wang ............... G01J 3/453 356/328 |
| 2007/0146719 | A1* | 6/2007 | Wedel ............... A61B 5/0059 356/445 |
| 2007/0263214 | A1 | 11/2007 | Fateley et al. |
| 2014/0218726 | A1* | 8/2014 | Cheng ............... G01N 21/65 356/301 |

OTHER PUBLICATIONS

Schwider, J. et al.: "Dispersive interferometric profilometer", Optics Letters, vol. 19, No. 13, 1994, pp. 995-997.
Mehta, Dalip Singh et al.: "Simultaneous three-dimensional step-height measurement and high-resolution tomographic imaging with a spectral interferometric microscope", Applied Optics, vol. 41, No. 19, 2002, pp. 3874-3885.
Choi, Samuel et al.: "Multifrequency Light Source Using Spatial Light Modulator for Profilometry" (Conference on Lasers and Electro-Optics Pacific Rim (CLEO-PR) 2013, WPF-15).
Johnson, William R. et al.: "Snapshot hyperspectral imaging in ophthalmology", Journal of Biomedical Optics, vol. 12, No. 1, 2007, pp. 014036-1-014036-7.
Wu, Yuehao et al.: "Development of a digital-micromirror-device-based multishot snapshot spectral imaging system", Optics Letters, vol. 36, No. 14, 2011, pp. 2692-2694.
Logozzo, Silvia et al.: "A Comparative Analysis of Intraoral 3d Digital Scanners for Restorative Dentistry", The Internet Journal of Medical Technology, vol. 5, No. 1, 2011.
Puri, Sameer: "The State of Digital Dentistry in 2012", dentaltown, 2012, pp. 126-131.
Venkatachalam, P. et al.: "Diagnosis of Breast Cancer Based on FT-IR Spectroscopy", American Institute of Physics, Conf. Proc. 1075, 2008, pp. 144-148.
Lee, So Yeong et al.: "Infrared spectroscopy characterization of normal and lung cancer cells originated from epithelium", Journal of Veterinary Science, vol. 10, No. 4, 2009, pp. 299-304.
Bellisola, Giuseppe et al.: "Infrared spectroscopy and microscopy in cancer research and diagnosis", Am. J. Cancer Res., vol. 2, No. 1, 2012, pp. 1-21.
Dadesh, Khaled M. et al.: "High Speed Low Noise Multiplexed Three Color Absorbance Photometry", 33rd Annual International Conference of the IEEE EMBS (Engineering in Medicine and Biology Society), 2011, pp. 39-42.
Mansour, Mohamed: "Overview of Optical Impression Systems" Mar. 16, 2013.

* cited by examiner

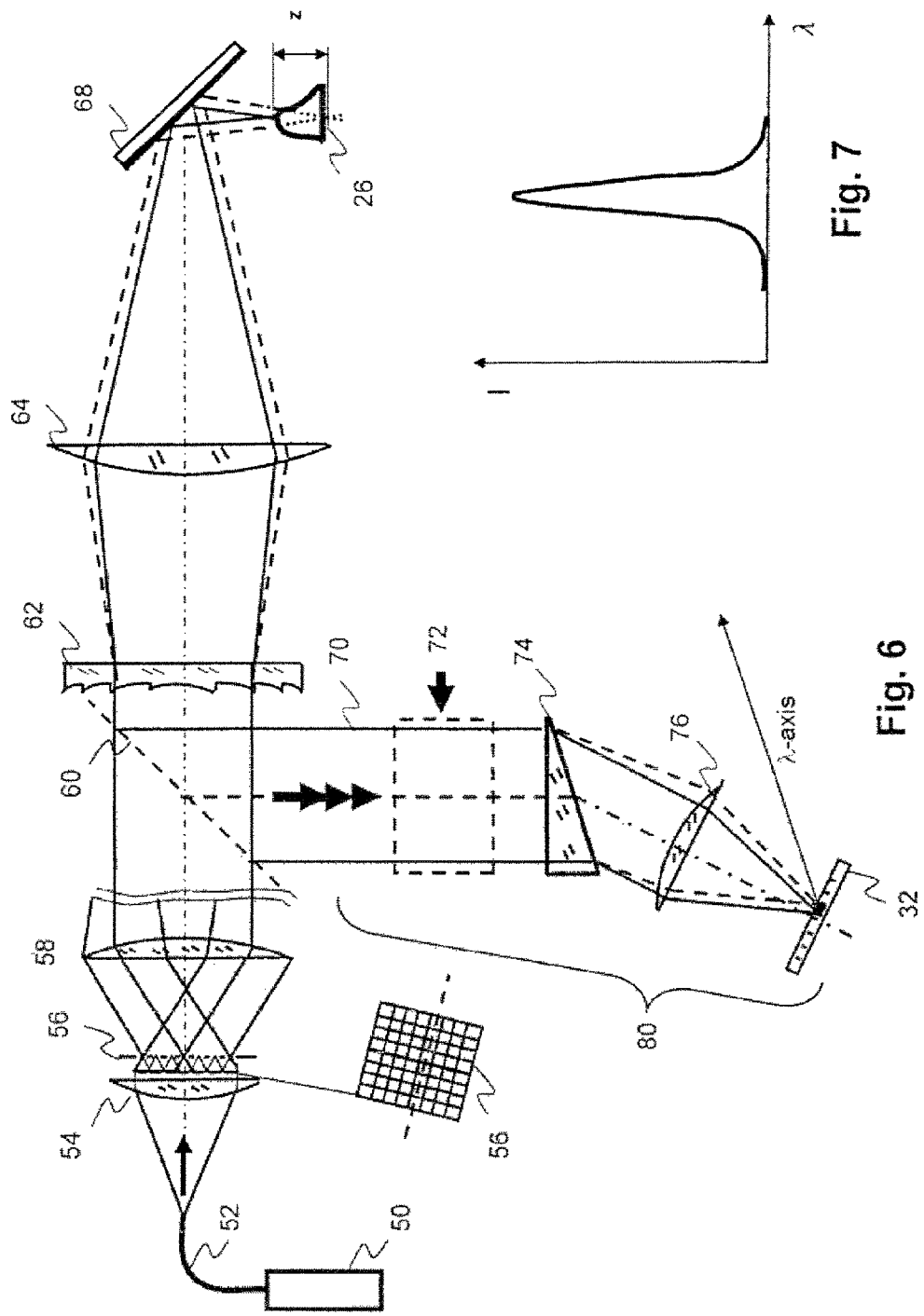

METHOD AND DEVICE FOR GENERATING MULTISPECTRAL OR HYPERSPECTRAL LIGHT, FOR HYPERSPECTRAL IMAGING AND/OR FOR DISTANCE MEASUREMENT AND/OR 2D OR 3D PROFILE MEASUREMENT OF AN OBJECT BY MEANS OF SPECTROMETRY

RELATED APPLICATIONS

The present application is a U.S. National Phase of International Application No. PCT/EP2015/000344, filed Feb. 17, 2015, entitled "Method And Device For Generating Multispectral Or Hyperspectral Light, For Hyperspectral Imaging And/Or For Distance Measurement And/Or 2d Or 3d Profile Measurement Of An Object By Means Of Spectrometry" and designating the United States of America. This application claims the benefit of the above-identified application which is incorporated by reference herein in its entirety.

BACKGROUND

The present invention relates to methods and devices for generating multispectral or hyperspectral illuminating light having an addressable spectrum, in particular for (adaptive) multispectral or hyperspectral imaging, for detecting structural or topographic object information, and/or for measuring the two-dimensional (2D) or three-dimensional (3D) profile of an object, or for measuring the distance to an object by means of spectrometry Document DE 10 2006 007 172 B4 discloses a method and a device for rapid, space-resolved, two-dimensional spectroscopic analysis and multispectral imaging. The device comprises a rasterized, two-dimensional array of micro-lenses and pinholes assigned to the respective focal points of the micro-lenses, a two-dimensional detector matrix in the detection light path, and means for lateral spectral splitting and for focusing the multispectral light incident on the two-dimensional detector matrix such that a spectral axis is present on the detector matrix. The two-dimensional array is arranged on the two-dimensional matrix so as to be inclined toward the spectral axis by an acute angle, thereby allowing for optimum use of the detector matrix area. Space resolution of this method, however, is not optimum.

Document U.S. Pat. No. 8,014,569 B2 discloses a method and a device for food assessment. In this method, light patterns generated by means of DMD application are projected onto the sample (fruit, vegetable or other food), said light patterns being subsequently analysed by means of variable spectral filters so as to obtain information on the state of the sample.

The article "Snapshot Hyperspectral Imaging in Ophthalmology" by W. R. Johnson et al., published in Journal of Biomedical Optics Vol 12 (1) 014036, 2007, discloses a device for hyperspectral imaging. The spectral data are obtained from a single camera image only, which is why comparatively high demands must be made on the grayscale resolution of the camera in order to be able to achieve acceptable color resolution. Therefore, the solution presented in this article can be very limited as regards photometric accuracy.

The article "Development of a digital-micromirror-device-based multishot snapshot spectral imaging system" by Y. Wu et al., published in Optics Letters, Vol. 36, No. 14, pp 2692-1694, 2011 likewise presents a solution including only one camera image for spectral imaging with compressive sensing (CS). The results shown do not exhibit high photometric accuracy, which is inherent to the principle as only one camera image is processed. The required processing power, however, is comparatively high, when standard computer technology in the year 2010 and a typical color object are considered.

The article "Dispersive interferometric profilometer" by J. Schwider and L. Zhou, published in Optics Letters, Vol. 19, No. 13, pp 995-997, 1994 suggests an interferometric system which combines a two-beam interferometer and a spectrometer. Therein, the interference signal is spectrally split by means of a grating such that stripes of the same color order are generated. Two-dimensional detection of the measured object can only be achieved in a time-serial manner by relative movement between spectrometer and measured object.

The article "Multi-frequency Light Source Using Spatial Light Modulator for Profilometry", S. Choi et al., published in the Conference Proceedings of CLEO-PR 2013, WPF-15, suggests a light source for generating spectral frequency combs with controllable wavelengths and frequency spacing for spectral interferometry or frequency comb interferometry. This allows for rapidly measuring spectral interferometry, in particular if knowledge is present a priori at least approximately on the size of the optical path difference in the spectral interferometer, for example if the measured object is an almost planar, small object or a thin layer, and if said optical path difference is limited to the rather microscopic region. For hyperspectral imaging or for three-dimensional measuring methods—such as the chromatic confocal method—, however, the suggested light source is not applicable or applicable with limitations only.

Further, from prior art there are known methods and corresponding devices for multispectral or hyperspectral imaging using tunable light sources (so-called "swept sources"). These methods and devices, however, are very slow and are not suited for "real time" imaging or measurements, respectively. The article "Simultaneous three-dimensional step-height measurement and high resolution tomographic imaging with a spectral interferometric microscope" by D. Mehta et al. in Applied Optics, Vol. 41, No. 19, pp 3874-3885, 2002 describes a tunable light source having liquid crystal based Fabry-Perot interferometers which normally provides quasi-monochromatic light only.

A further disadvantage of the prior art methods and devices for multispectral or hyperspectral imaging is the reduced signal-to-noise ratio because not all of the spectral components are simultaneously in optical and/or data connection with the imaged or analysed object. Moreover, these methods lack flexibility as regards selection of the parameters for hyperspectral analysis.

It is an object of the present invention to provide improved methods and devices for multispectral or hyperspectral imaging, for detecting structural and topographic information on an object or the distance to an object by means of spectroscopy, or for spectral modulation of radiation across space and time with dynamics reduction. In particular, it is an object of the invention to obtain multispectral or hyperspectral information on an object over the whole surface, wherein spatial resolution and/or the signal-to-noise ratio and/or the information acquisition speed are improved.

These objects are achieved by an illumination device for generating multispectral or hyperspectral illuminating light having an addressable spectrum according to claim 1, a multispectral or hyperspectral imaging device according to claim 7, a multispectral or hyperspectral measuring device according to claim 12, a method of generating multispectral or hyperspectral illuminating light according to claim 13, and a method of multispectral or hyperspectral imaging and/or of distance measurement and/or topographic measurement according to claim 16. Preferred embodiments are subject of the subclaims.

According to a first aspect of the invention, there is provided an illuminating device for generating multispectral or hyperspectral illuminating light having an addressable spectrum. The illuminating device comprises a multispectral light source and a modulator, or modulation device, for temporal modulation of the individual spectral components of the light emitted by the multispectral light source, wherein the temporal modulations of the individual spectral components are different from one another. In particular, the individual spectral components are modulated with mutually different modulation frequencies, modulation frequency ranges and/or modulation sequences.

The multispectral light source can comprise
(i) at least one light source having a continuous, quasi-continuous, or frequency comb spectrum, and (first) wavelength-dispersive means for spectral splitting of the light emitted by the light source in a plurality of spatially separate spectral components having mutually different wavelengths $\lambda_1, \lambda_2, \ldots, \lambda_n$ or wavelength bands, respectively; and/or
(ii) an assembly or array of spatially separate monochromatic or quasi-monochromatic light sources which are configured to emit light having predetermined emission wavelengths $\lambda_1, \lambda_2, \ldots, \lambda_n$ or emission wavelength bands, differing from one another.

Accordingly, the modulator can comprise
(i) at least one electrically controllable spatial light modulator which is configured to modulate the individual spectral components in terms of time; or
(ii) a plurality of electronic control modules assigned to the individual monochromatic, quasi-monochromatic light sources.

The illuminating device further comprises optical means which are configured to combine the individual, modulated spectral components such that the individual, modulated spectral components substantially spatially overlap each other so as to form the multispectral or hyperspectral illuminating light. The optical means can comprise (second) wavelength-dispersive means (e.g. diffraction gratings, prisms, etc.). The second wavelength-dispersive means are configured to compensate for the spatial separation of the individual spectral components or the angular difference of the individual spectral components, respectively.

The generated multispectral light having an addressable spectrum can be employed in a variety of applications, in particular for medical and measuring applications. In the present application, the term "light" is understood as any electromagnetic radiation, e.g. any electromagnetic radiation within the visible spectral range (VIS), the ultraviolet spectral range (in particular in the extreme (EUV), deep (DUV) or weak (UV) ultraviolet), the infrared spectral range (in particular in the near (NIR), mid (MIR) or far (FIR) infrared, in the terahertz spectral range and/or in the X-ray range.

The multispectral light source can comprise at least one light source having a continuous, quasi-continuous spectrum, or a frequency comb spectrum and wavelength-dispersive means. The light source can be, for example, a line source or a point source, e.g. at least one light emitting diode (LED), a white light diode, a super luminescent diode (SLD), etc. Likewise, the light source can be a light source having a quasi-continuous spectrum, e.g. a light source comprising a plurality of individual sources having different, spatially overlapping spectral lines or spectral ranges, respectively. The light source can further comprise at least one frequency comb laser or a super luminescent diode (SLD) with downstream Fabry-Pérot interferometer (FPI). The source of electromagnetic radiation, in particular for the mid infrared range, can be formed as a synchrotron radiation source.

The individual spectral components can be spatially separated from each other by means of wavelength-dispersive means. The wavelength-dispersive means are preferably configured and arranged such that the light emitted by the light source is spectrally split such that the individual spectral components having mutually different wavelengths or wavelength band ranges are spatially separate from each other in a two-dimensional or three-dimensional region (e.g. in a predetermined plane). In this three-dimensional region, there is at least one lateral wavelength axis, or spectral axis, or a predetermined, laterally structured range of intensities having different wavelengths. These latter spectral ranges can be located substantially perpendicular with respect to the wavelength axis. The wavelength-dispersive means can be, for example, diffraction gratings, prisms, Fabry-Pérot interferometers, etc.

At least one electrically controllable spatial light modulator can be arranged in the two-dimensional or in the three-dimensional region. The spatial light modulator (SLM) is configured to accomplish time modulation of the individual, spatially separated spectral ranges. For example, a different time modulation of the individual spectral ranges or spectral components, respectively, can be obtained in lateral direction (along the wave axis), by varying the degree of reflection and/or the degree of transmission, and/or the degree of absorption of the electrically controllable spatial light modulator using a predetermined controlled time modulation (periodic or aperiodic). In other words: time modulation of the spatially separated, differing spectral ranges is accomplished by means of space-time modulation, or control, of the spatial light modulator.

The term "spatial light modulator" covers all kinds of spatial modulators, including spatial modulators for light in the visible, the infrared, the ultraviolet or terahertz range. The spatial modulator can, for example, modulate the degree of reflection and/or the degree of transmission, and/or the degree of absorption of the incident light. Suitable spatial modulators are, for example a digital mirror device (DMD), a liquid crystal display (LCD), a liquid crystal on silicon (LCoS). The DMD is preferably used as the spatial modulator. DMDs have very high light efficiency as regards the light modulated elements, which is better than in the case in which the DMD is used as an amplitude diffraction grating.

Multispectral light having a plurality of spatially separated spectral components can also be generated by means of an assembly or an array of monochromatic or quasi-monochromatic, discrete light sources which are arranged so as to be spatially separated. The individual light sources within the assembly or the array are configured to emit light, or light rays, having mutually different emission wavelengths $\lambda_1, \lambda_2, \ldots, \lambda_n$ or emission wavelength bands. The individual discrete light sources can be controlled directly by means of electronic control modules assigned to the respective individual light sources, so as to time-modulate the intensity of the individual emission wavelengths or emission wavelength bands. In this case, the multispectral light source can comprise an assembly or an array of LEDs, SLDs, laser diodes, etc. each emitting light having a predetermined wavelength or light in a predetermined narrow spectral range.

The number of spectral components can be selected in dependence on the desired application of the illuminating device. If the illuminating device is used in a measuring device for detecting the 2D or 3D profile of an object and/or for measuring the distance to an object, the number of individual spectral components, or the distance of the individual spectral lines, respectively, can preferably be selected such that each spectral line, or each spectral component, addresses, or corresponds to, a distinct depth in the object space.

The device for generating multispectral or hyperspectral illuminating light having an addressable spectrum can further comprise means which are configured to spectrally filter the light emitted by the light source having the continuous, quasi-quasi-continuous, or frequency comb spectrum, or the light emitted by the individual monochromatic or quasi-monochromatic light sources. The means for selective spectral filtering can be configured to selectively filter out, or cut-off, individual spectral components and/or spectral ranges from a wide spectral range. The means for selective spectral filtering can be one or more fixed or electrically controllable spectral filters and/or light traps and/or absorbers, or other optical components.

The means for elective spectral filtering can be connected downstream the light source having the continuous, quasi-continuous, or frequency comb spectrum, or the individual monochromatic or quasi-monochromatic light sources. Further, the means for selective spectral filtering can be integrated in the spatial modulator or in the electronic control modules (e.g. as part of the controller).

In particular, the spatial light modulator can be configured to perform selective adjustment, or selective filtering, of the spectral range of the continuous, quasi-continuous, or frequency comb spectrum light source. For example, the spatial light modulator can be configured to filter out, or cut-off, individual spectral components and/or spectral ranges (e.g. by deflection toward a light trap). In one embodiment, the spatial modulator can serve as a variable (e.g. relatively narrow-band) spectral filter.

Spectral filtering of the spectral range allows for adaptation of the multispectral illuminating light to the purpose of the respective application. This is advantageous, in particular when medical applications are concerned where living objects are examined. Since the multispectral light can be exactly adapted to the subject to be illuminated, or examined, needless exposure of the subject to be illuminated to radiation which might be harmful to the tissue can be avoided or minimized, in particular where a synchrotron light source or another source of potentially injurious or harmful electromagnetic radiation is used as the light source. In contrast, conventional attempts of spectral measurement, in particular in the MIR range, use a spectrum as complete as possible for illumination in order to detect any possible spectral effect.

In one embodiment, the spectral distributions applied are predetermined, or specifically thinned out, by the means for selective spectral filtering. Those spectral components which most certainly do not address any tumor markers or other relevant markers, and which do not contribute to acquiring information can thus be excluded or filtered out. This is advantageous in that the exposure (e.g. if an infrared radiation source is used, the thermal load which is generated in the tissue due to high absorption of water) of the illuminated subject (e.g. an organ) is reduced. Further, the radiation energy can be increased in those spectral ranges where spectral tumor markers or other relevant markers are present. This allows for obtaining a higher signal-to-noise ratio of the measuring signal, or the spectral information obtained, respectively, leading to higher velocity and accuracy of the measurement, or imaging, respectively. Since the detected signals which are processed for obtaining information on the illuminated subject contain less spectral components, the velocity of measurement or imaging, respectively, can be increased, too.

Further, it is possible to have a frequency spread in the signal space of the spatial light modulator and/or of a detector and/or of a digital signal processing device. Therein, spreading in the frequency range of the modulation can be higher than in the range of the physical wave numbers.

For example, a plurality of different narrow band signatures (e.g. tumor marker narrow band signatures) can be addressed one after the other (e.g. 3×5 different narrow bands instead of 30 potential narrow bands at the same time). With these narrow bands, or spectral components, addressed via SLM elements, a "quasi frequency spread" in the low-frequency frequency range of the electric/digital signal processing is performed by means of the SLM elements, as described below. Thus, optimal use of the signal processing and the signal transmission capacities provided by the system and the components is possible. Therein, the physical wavelength/wave number of the narrow band radiation remains unchanged. A low-frequency spread—typically far below 10 KHz—is accomplished only within the signal space of SLM, detector and digital data processing. Further, it is possible to provide for a frequency spread for ensuring optimal use of signal transmission and signal analysis when known components and systems are used.

The suggested solution of selective filtering of individual spectral ranges and/or spectral components and of the frequency spread can be used independently of the above described time modulation of the individual spectral components. A solution of this kind is advantageous in particular when the illuminating device is used in the medical field for illuminating living subjects (e.g. within the framework of therapeutic measures, such as during a surgical intervention) where only the information required by the surgeon (cutting off tissue yes/no) must be obtained with high accuracy and at the required speed (few minutes at maximum, e.g. less than 20 minutes for the total time of all diagnostic measures during a surgical intervention).

The suggested solution of selective filtering of individual spectral ranges and/or spectral components, and of frequency spread (also referred to as selective spectral frequency spread and or selective frequency spread) is particularly advantageous if a brilliant source of high spatial coherence, in particular also in the mid infrared range (MIR) is used as the source. Examples of such sources include, e.g. synchrotron radiation sources having very high-energy, brilliant radiation, in particular also in the mid infrared (MIR), or laser batteries of spectrally finely tuned lasers, which radiate also in particular in the mid infrared (MIR).

In one embodiment, the radiation from a brilliant source of high spatial coherence is spectrally split very finely, for example using a device for spectral splitting of electromagnetic radiation (e.g. with a high-resolution grating spectrometer) in the MIR. Suited means are used for selecting specific spectral ranges which contribute to acquisition of information, e.g. spectral ranges which address known tumor markers. Each spectral range can comprise a plurality of individual spectral components (e.g. as narrow spectral bands).

Those spectral components and/or spectral ranges which are not selected can be filtered using suitable means for spectral filtering, and can be excluded from propagation toward the subject to the best possible extent. For example, spectral components and/or spectral ranges not selected can be directed toward light traps or can be "blanked".

A spatial light modulator which is preferably optimized for the MIR can be assigned to each of the selected ranges. The spatial light modulators usually are spatially separated from each other in the area (plane) of spectral splitting of the device for spectral splitting of electromagnetic radiation. As an alternative, spatially separated ranges of one single spatial modulator can be used. The illuminating device can comprise optical means which are configured to deflect, or to image, the light from the spatially separated spectral ranges onto the different ranges of the spatial light modulator.

Spectral splitting (resolving power) of the device for spectral splitting of electromagnetic radiation can be chosen such that each spectral component can be assigned its unique harmonically oscillating element of the spatial light modulator. As an alternative, a group of elements of the spatial light modulator can be assigned to each spectral component. Each spectral component is modulated by the element of the spatial light modulator assigned thereto, or by the group of elements of the spatial light modulator assigned thereto with the frequency assigned to the element. Accordingly, the spread in the frequency range of the modulation can be much greater than in the range of the physical wave numbers.

The subject under examination (e.g. a patient's organ during a surgical intervention) is radiated with the addressed multispectral radiation. The irradiated subject is viewed using a detector which is preferably designed for the MIR. Information on the subject under examination can be acquired through frequency analysis of the detected signal (e.g. a lock-in detection).

Specific selection and addressing of certain spectral ranges and/or spectral components allows for improving the signal-to-noise ratio and for reducing the signal processing time. Further, exposure of the illuminated subject can be reduced as only a relatively small portion of the radiation from the source contributing to information acquisition reaches the subject. Therein, the brilliant source can run at "full load".

Another solution is in time sequential wavelength tuning by means of SLM in a device for high-resolution spectral splitting. In this case, only one single narrow band radiation, or one single spectral component, is applied. As this solution requires an especially high luminosity of radiation, this solution is usually inferior to the solution using a plurality of narrow band lines, or a plurality of spectral components, as regards the signal-to-noise ratio that can be achieved.

Preferably, the light source, or the individual monochromatic or quasi-monochromatic light sources have as high luminosity as possible, thereby improving spectral resolution.

Time modulations of the individual spectral components can differ in their modulation frequency, modulation frequency range, modulation sequence and/or the starting phases of the modulations. For example, the time modulations of the individual spectral components can differ in their basic frequency or in their (relatively narrow) basic frequency range (wherein harmonic waves can occur) and/or in their modulation sequence.

The time modulation of the individual components can be periodic or aperiodic, wherein harmonic waves can occur, too. In particular, the individual spectral components can be time modulated with harmonic oscillations, with the modulation frequencies lying in the range of below 10 MHz, preferably in the range of 10 Hz to 10 KHz.

Modulation may comprise a frequency chirping, i.e. a time variation of the modulation frequency of the preferably harmonic oscillations or modulations, respectively. This can be achieved by a time variation of the modulation frequency of the SLM or of the modulation frequency of the individual control modules, respectively.

As an alternative or in addition, the modulation device can be configured to differently determine, select, or vary, respectively, the starting phases of the modulations of the individual spectral components. Further, the modulation device can be configured to image, in a nonlinear manner, the starting phases of the modulations of the individual spectral components in the signal detected by a rasterized detector. The variation of the starting phases can differ from modulation frequency to modulation frequency, and can occur in a linear or in a nonlinear manner. Likewise, stochastic or random variation is possible. Preferably, variation of the starting phases is time-invariant.

Preferably, the variation of the starting phases is not random, but controlled. For example, the phase shifts (with respect to the starting time or reference time) can be continuously falling or continuously rising. Preferably the phase shifts are nonlinear, preferably square, depending on the modulation frequency. Preferably, the magnitude of the phase angle changes only little. In this case, the processing power required for calculating the spectra, or for spectral discrimination mostly tends to a minimum. Further, optimal results can be obtained, i.e. the calculated spectra have minimum error.

Further, the modulation device can be configured to vary the amplitudes of the preferably harmonic modulations of the individual spectral components in terms of time. In particular, the modulation device can be configured to perform an apodization wherein normally the amplitudes in the harmonic oscillations preferably decrease after the start of the modulation (e.g. after the beginning of the oscillations at the SLM elements).

As explained below, the above solutions allow for reduction of the demands on the dynamics of the detector because the signals recorded usually have lower mid signals).

If the illuminating device is, for example, used in a device for multispectral or hyperspectral imaging for illuminating an object, the time signal for each pixel is obtained pixel-by-pixel from an image batch of the camera which is read out for a predetermined period of time. As there are many pixels, a corresponding number of time signals are recorded. In particular, the pixels of the camera at any time record a sum signal as overlap of all the individual signal oscillations generated by the spatial light modulator or by the control modules. Herein, an individual frequency $f\_i$ is assigned to a physical wave number band $delta\_kb\_i$ which was created by spectral splitting, by means of special control of the spatial light modulator or of the control modules, for example by light of a wave number band $delta\_kb\_i$ being incident on an SLM element I which oscillates with the frequency $f\_i$ in a computer-controlled manner.

In dual-beam interferometry with multispectral light, the chirp effect means that the optical path difference of zero is obtained for radiation of different wave numbers for different reference mirror positions. This means that there is a varying phase difference above wave number k which is noticeable in the two-beam interferogram by a frequency change. In some cases, this frequency change is clearly noticeable in the two-beam interferogram and is referred to as chirping or chirp effect. In infrared Fourier transform spectroscopy, the phase difference above wave number k is numerically calculated from a short double-sided interferogram using an FFT, and is used for correction.

According to an aspect of the invention, however, a predetermined phase difference is deliberately imposed in order to reduce the mid peak in the sum signal (corresponding to the interferogram). This phase difference is thus known a priori. Accordingly, phase correction in the calculation of spectra can be carried out using the a priori known (predetermined) phase difference.

In a preferred embodiment, a signal having a chirp effect (=a chirped signal) is generated within the period of time, said signal being detected in a respective pixel j by means of an image batch taken by a camera (a rasterized detector). When observing, for example, the case of harmonic oscillations of the signal intensity over the period of time, the chirp effect means that each harmonic oscillation (in an assembly of oscillations) has a frequency-depending phase shift $phi(f\_i)$ at a reference time. This time can be the illumination starting time $t\_0$ (e.g. upon activation of the SLMs in the measuring process). Prior to the starting time $t\_0$, there is no light flux from the SLM or the electronically controllable multispectral light source, whereby illumination of the camera is effected starting at the starting time $t\_0$ with harmonic oscillations with the different frequency $f\_i$ and with different phase shift $phi(f\_i)$ (=different starting phase). During the complete measuring time, i.e. illumination time of the rasterized detector, the harmonic oscillations are preferably at no time all in-phase.

Signals (sum signals as overlap of a plurality of harmonic oscillations) with chirp effect are, however, only one of several possibilities of limiting dynamics of a signal.

In addition, or as an alternative, the starting phase of the individual harmonic oscillations can be selected, or determined, to be mutually different (accordingly, the starting phase value of zero merely is an exclusion). The starting phase of the individual harmonic oscillations can be continuously falling or rising, linearly or nonlinearly, or it can be randomly distributed. Therefore, there are sum signals exhibiting no chirp effect at all, or having no pronounced chirp effect. These signals, or sum signals can still have no pronounced maximum, and are thus suited for reducing the demands on the modulation of a detector.

In one embodiment, the individual spectral components can be modulated over the whole period with the respective invariable frequency assigned to them once (e.g. by means of a spatial light modulator). This frequency differs from spectral component to spectral component and is mathematically unambiguous. A narrow wave number band $delta\_kb\_i$ in the spectrum of the multispectral illumination bundle can be assigned to each spectral component. Each spectral component has the modulation frequency $f\_i$ at the SLM element i, assigned exclusively to the respective spectral component. A sum signal is created by overlap of the individual oscillations, generated by the differently oscillating elements of the spatial light modulator, with the overlap finally occurring on/at each of respective pixels of the camera. Although the frequencies of the individual harmonic, summed-up oscillations remain constant over the period of time, the detected time signal exhibits the effect of a variation in terms of frequencies of the individual modulations in the sum signal, wherein an increase or decrease of the frequency of the modulations (chirping) can often be observed in the sum signal. By means of specific interfering with respect to the starting phases in harmonic signals, modulation with dynamics reduction can be obtained.

Through frequency chirping (phase difference in the time domain) or through differing (including random) starting phases of the frequency encoding, optimum adaptation of the radiation intensity to the dynamics of the detection system (usually a camera, e.g. a CCD camera, or an alternating-light detector for the infrared spectral range) can be achieved, wherein the advantage is greater for an alternating-light detector since there is no need to detect a constant component in the alternating signal which also makes demands on the given scope of dynamics. This can improve the signal-to-noise ratio and reduce the measuring time, which constitutes a great advantage in particular where medical applications are concerned. This can, for example, make sure that during diagnosis of tissue during a surgical intervention, thermal stress of the tissue is not exceeded. In case of aperiodic modulation, control of the spatial light modulator is preferably synchronized with the detection system.

The modulation device can further be configured to linearly change the modulation frequency of the individual spectral components. The modulation frequency can, for example, be a linear function of the wavelength, or of the focus wavelength of a wavelength range, or of the wave number. In a spatial light modulator, the modulation frequency can, for example, change linearly along the spectral axis (the wave axis, or the wave number axis (in the k-space), e.g. in column direction or in row direction of the spatial light modulator. Preferably, the modulation frequency changes linearly with the way number. This allows for algorithmic easy evaluation which is quick and requires comparatively low computing power. It is, however, possible to change the modulation frequency non-linearly.

One advantage of the suggested illuminating device is the high flexibility thereof. For example, the parameters of modulation (time modulation and/or spatial modulation) can be flexibly selected and changed with a "mouse-click" depending on the respective application. The modulation frequency is freely selectable with respect to the physical wavelength of the electro-magnetic radiation. For example, the modulation frequency can be "inverted" with respect to the physical one. Further, the modulation frequency can be freely selected. In particular, the modulation frequency can be freely shifted: first, shortest wavelength with transformation to smallest modulation frequency, then shortest wavelength with transformation to greatest modulation frequency. In general, the positions of same modulation frequency can likewise be freely selected and can "travel", for example, in lateral direction (e.g. along the wave axis, or wave number axis of the spatial light modulator, or along the array of individual light sources with associated control module). This allows for better averaging of the obtained signal. The change of the modulation frequency can further be effected depending on the wavelength ratio or the wave number ratio such that the spectrum need not be transformed (stretched or compressed).

Further, the plurality of possible encodings, in particular in conjunction with suitable evaluation, allows for discrimination of a large number of spectral channels. A further advantage lies in the fact that use of movable parts is not required, which leads to a further increase of precision and accuracy of the device. Furthermore, the illuminating device can have a compact structure.

With the illuminating device according to the invention, it is possible to provide time-space-modulated electromagnetic radiation for a plurality of imaging and measurement methods and devices, such as for multispectral or hyperspectral cameras, for chromatic-confocal or interferometric, in particular also for spectral-interferometric measuring methods and devices, fluorescence microscopy, multi-photon microscopy, etc. With the time-space-modulated light, for example, spot light source illumination can be achieved within the object space of a chromatic-confocal measuring arrangement, thereby obtaining information on the 2D and 3D profile of an examined object via chromatic depth scanning.

According to a second aspect of the present invention, a device for multispectral or hyperspectral imaging is suggested, comprising the illuminating device for generating multispectral or hyperspectral illuminating light having an addressable spectrum according to the first aspect of the invention;

an image acquisition device which is configured to record a sequence of two-dimensional images of an object illuminated with the multispectral light, comprising at least one two-dimensional rasterized detector having a plurality of detector elements which are configured to detect the intensity of at least part of the light coming from the object (reflected or transmitted light, luminescence or fluorescence light);

an image evaluation device which is configured to determine the shares of the individual spectral components (in the acquired images, which have been, for example taken as an image batch) by a pixel-by-pixel analysis of the time variation in the intensity detected by each of the detector elements, and to form a multispectral or hyperspectral image of the object based on the determined shares of the individual spectral components.

In particular, the shares of the individual spectral components can be determined for each detector element by an analysis (e.g. a frequency analysis) of the detected intensity profile l(t), as well as on the basis of information on the used encoding and modulation, respectively, of the individual spectral components, and a multispectral or hyperspectral image of the object can be generated. The information on the used encoding or modulation, respectively, can comprise, for example, information on the assignment of the individual frequency components to the individual spectral ranges, e.g. via a look-up-table (LUT).

As described above, the modulation device can be configured to modulate the individual spectral components with different basic frequencies or basic frequency ranges and/or with different modulation sequences. The image evaluation device can be configured to perform, for each detector element, a frequency analysis of the time variation of the detected intensity and a modulation-wavelength conversion by means of an (at least approximately known a priori) assignment (via an LUT, for example) of the determined modulation frequencies to a certain basic frequency or a certain basic frequency range and/or a certain modulation sequence of the individual spectral ranges.

For example, the analysis carried out by the image evaluation device can be, or comprise, a pixel-by-pixel Fourier analysis, in particular an FFT analysis, a wavelet analysis, a lock-in detection, or another suitable analysis of the detected intensity profile, or the detected time-variation of the intensity. The image evaluation device can further be configured to perform a correlation of the modulations determined using the detected intensity with the modulations of the spectral components accomplished by the modulation device in order to discriminate the individual spectral components.

The device for multispectral or hyperspectral imaging can further comprise a synchronization device which is configured to synchronize the modulation of the individual spectral components by means of the modulation device and image acquisition by means of the image acquisition device.

This way, especially where aperiodic encodings are concerned, synchronization in terms of time can be performed between the modulation device for multiplex encoding, in terms of frequency, of the spectral components of the multispectral light, or of the spectral distribution of one of more light sources, respectively, and the image acquisition device (in particular the two-dimensional detector). If a priori information are available on the encoding used or in case of periodic encoding, synchronization can be omitted. In particular, start of the SLM modulation, or SLM control or control of the individual electronic control modules, respectively, can be synchronized with the start of image acquisition. The synchronization allows for improving stability, accuracy, and image quality of the multispectral or hyperspectral imaging device.

The device for multispectral or hyperspectral imaging can further comprise a plurality of Fabry-Pérot filters for demodulating the spectral wavelets in the frequency space.

The device for multispectral or hyperspectral imaging can further comprise a memory for temporarily and/or permanently storing the detected sequence of two-dimensional images; and/or for temporarily and/or permanently storing the determined multispectral or hyperspectral image. The image evaluation device can further comprise at least one processor (e.g. a graphics processor) which is configured to carry out the required mathematical operations for generating the multispectral or hyperspectral image of the object. The processor can further be configured to render the generated, and if applicable stored image of the object for display (preferably as a 3D picture) on a display device (e.g. a computer monitor, camera monitor, etc.). The display device can be part of the device for multispectral or hyperspectral imaging.

The imaging device and the image evaluation device can be integrated with a camera module, e.g. in a so-called "smart camera", i.e. a camera having computing capacity, or "on-chip intelligence". In dependence on the application, the rasterized detector can be a CCD camera, a CMOS camera, a bolometer array for MIR spectral range, InGaAs camera for NIR spectral range, etc. for example.

One advantage of the suggested device for multispectral or hyperspectral imaging is that all spectral components are in optical contact with the object substantially at the same time. This allows for considerably reducing the signal-to-noise ratio. A further advantage resides in the massive parallelizability of data acquisition and data processing, which is possible in particular thanks to the use of specialized hardware (such as smart cameras, graphics processors, etc.) and software. Further advantages include the advantages already mentioned in connection with the illuminating device, such as high flexibility, decoupling of the modulation frequency from the modulated physical wavelength of the electromagnetic radiation, the large number of possible encodings and spectral channels.

According to a third aspect of the invention, there is provided a multispectral or hyperspectral measuring device for distance measurement for and/or for topographic measurement of an object by means of spectrometry using an illuminating device according to the first aspect and a device for multispectral imaging according to the second aspect. The measuring device for distance measurement for and/or for topographic measurement further comprises—depending on the application—a chromatic-confocal system, a chromatic triangulation system, a spectral interferometer, a fluorescence microscope, or a multi-photon microscope.

Thereby, color data, data regarding the distance to one or more objects, the 2D or 3D profile of an object, topography of an object, distribution of certain materials and/or structures within an object, etc. can be obtained.

Preferably, the light supply in the above devices according to the first to third aspects is accomplished at least partly via light conductors. For example, the light can be guided to the spatial light modulator and/or to the other optical components (such as the chromatic-confocal system, microscope lens, etc.) at least partly vial light conductors. Preferably, a multi-bundle (e.g. 8 bundles) to single-bundle coupling and/or a multi-fiber (e.g. 8 fibers) to single-fibre coupling is performed. Light supply or light guiding, respectively, between the individual optical components can likewise be accomplished by means of adapted optical deflection devices, comprising at least a mirror, beam splitter, a lens, and/or other optical elements.

According to a fourth aspect of the invention, there is further suggested a method of generating multispectral or hyperspectral illuminating light having an addressable spectrum. The method comprises:

generating multispectral light; and time-modulating the individual spectral components of the multispectral light (including in particular time-modulation of the amplitude of the individual spectral components and/or determination of the starting phase of the modulations) with modulation frequencies, modulation frequency ranges, and/or modulation sequences differing from each other, respectively, wherein (i) the generation of multispectral light comprises spectral splitting of the light emitted by a continuous, a quasi-continuous, or a frequency comb light source in a plurality of spatially separate spectral components having mutually different wavelengths $\lambda_1, \lambda_2, \ldots, \lambda_n$ or wavelength bands; and the time modulation of the individual spectral components is accomplished by means of an electrically controllable light modulator; or (ii) the generation of multispectral light comprises the emission of light having a plurality of mutually different spectral components with mutually different emission wavelengths $\lambda_1, \lambda_2, \ldots, \lambda_n$, or emission wavelength bands from an arrangement or an array of a plurality of monochromatic or quasi-monochromatic light sources, and the time-modulation is accomplished by means of electronic control modules assigned to the individual light sources; and wherein the method further comprises combining the individual modulated spectral components of the light emitted by the multispectral light source such that they substantially spatially overlap each other so as to form the multispectral or hyperspectral illuminating light having an addressable spectrum.

As explained in connection with the illuminating device according to the first aspect of the invention, time modulation of the individual components can be periodic or aperiodic. Time modulation can comprise, e.g., frequency chirping or a variation of the starting phases, which is different from modulation frequency to modulation frequency, but is preferably time-invariant. Variation of the starting phases is preferably non-linear, depending on the modulation frequency; in particular it is preferably square. Further, time modulation can comprise a linear change of the modulation frequency of the individual spectral components.

Further, modulating can comprise changing the amplitude of the modulations of the individual spectral components. For example, an apodization can be carried out.

Further, the method of generating multispectral or hyperspectral illuminating light preferably comprises selective spectral filtering of the light emitted by the light source having the continuous, quasi-continuous or frequency comb spectrum, or of the light emitted by the individual monochromatic or quasi-monochromatic light sources, as described in connection with the illuminating device according to the first aspect of the invention.

According to a fifth aspect of the present invention, there is further suggested a method of multispectral or hyperspectral imaging and/or of distance and/or topographic measurements of an object. The method comprises:

generating multispectral or hyperspectral illuminating light having an addressable spectrum according to the method of the fourth aspect of the present invention;

illuminating the object with the multispectral or hyperspectral illuminating light;

detecting a time sequence (image batch) of two-dimensional images of the illuminated object using a two-dimensional rasterized detector having a plurality of detector elements, the detector being configured to detect the intensity of at least part of the light coming from the object;

determining the shares of the individual spectral components by means of a pixel-by-pixel analysis of the time variation of the light intensity detected by each detector element, and generating a multispectral or hyperspectral image of the object based on the determined share of the individual spectral components.

Determining the shares of the individual spectral components can comprise a frequency analysis of the time variation of the detected intensity, or of the respective detector signal, and a modulation wavelength conversion by means of an (at least approximately a priori known) assignment of the determined modulation frequencies to a specific basic frequency, or to a specific basic frequency range and/or to a specific modulation sequence of the individual spectral ranges.

Determining the shares of the individual spectral components can comprise a pixel-by-pixel Fourier analysis or a wavelet analysis of the detector signals, or of the intensity detected by each detector element, respectively, and/or a correlation of the modulations determined using the detected intensity with the modulations of the spectral components performed by the modulation device.

Preferably, the method further comprises synchronizing of modulation of the individual spectral components and detection of the time sequence (image batch) of two-dimensional images.

The methods and devices according to preferred embodiments of the present invention can exhibit the following advantages:

In comparison to the solutions using tunable light source (the so-called "swept source" solution) the solution according to the invention is advantageous in that all the spectral components, or a plurality of spectral components are on optical contact with the object at the same time, which leads to higher light efficiency and improved signal-to-noise ratio. A further advantage related to signal processing resides in the massive parallelizability which is possible in particular thanks to the use of so-called smart cameras or specialized graphic processors. A further advantage is the fact that all the optical elements (e.g. dispersive optical elements, spatial modulators, etc.) can be optimally used as regards the optical efficiency thereof.

Further advantages of the devices and methods according to preferred embodiments of the present invention can comprise:

Very high flexibility of the parameters of spectral and spatial resolution in multispectral and hyperspectral imaging. The parameters can be changed by "mouse click".

Very high data rate thanks to multiplexing and highly parallelizable signal evaluation;

3D-detection is also possible with high flexibility and in a very wide range of scales;

Very high scalability, such that nano-, micro-, and macro-applications are possible, too;

Possibility of miniaturization;

Simple realization, also for mass products;

High detection speed, reliability, and specific in multispectral and hyperspectral imaging. For example, a "quasi time-resolved" detection of tissue is possible in wide spectral ranges (VIS, NIR, MIR, FIR, Terahertz range). Thus, changes in the tissue structure (e.g. changes of the blood supply of the tissue during medication, monitoring in intensive care) over the time can be visualized in real time or quasi-real time for the physician in a two-dimensional image of the organ (e.g. after a transplantation). Further very good adaptation to a wide field of diagnostic tasks is possible in ambulant or hospital medical treatment.

The suggested devices and methods of generating multispectral or hyperspectral illuminating light for multispectral or hyperspectral imaging and measurement are in particular suited for rapid, full area multispectral or hyperspectral 2D or 3D imaging and examinations. Further, the suggested devices and methods are suited for imaging examinations through detection of the reflected, transmitted, absorbed or scattered light, or of the luminescence light (including fluorescence light) emitted by the object.

The fields of application of the invention comprise:

Multispectral or hyperspectral cameras, including cameras for mass production;

Medical applications for ambulant or hospital patients' diagnostics, e.g. in dental diagnostics, diagnosis of tumor diseases, in particular for rapid and reliable diagnosis, or detection of tumors (status analysis) during surgical interventions;

Dental technology, in particular 3D dental technology on patients (in vivo) with spectral analysis of the tooth material so as to improve aesthetics of dental prostheses by optimal adaptation of the dental prostheses to the natural color of the teeth.

Applications in measuring technology in material science, e.g. for welding line inspection, 2D or 3D detection of object profiles and topographies with simultaneous detection of color, e.g. for detection of traces of powder);

Production monitoring (e.g. for rapid high-resolution multispectral and hyperspectral imaging of textiles, colors, varnish, resins, etc.);

Monitoring of food production (e.g. examination of the degree of ripeness of fruit and vegetables, of freshness of animal products, etc.);

Animal rearing;

Medical research;

Protection against forgery (e.g. for examination of bank notes, paintings, etc.);

Analysis of objets d'art (e.g. for analysing varnish layer succession);

Rapid and high-resolution 3D detection by means of spectral information in technical and medical applications, in particular for 3D-measuring technology, such as chromatic-confocal sensor technology, chromatic triangulation measuring technology and spectral-interferometric applications;

Microscopic analysis.

BRIEF DESCRIPTION OF THE DRAWINGS

Further objects, features and advantages of the present invention obviously result from a detailed description of preferred embodiments thereof, given with reference to the accompanying drawings, wherein:

FIG. 6 shows a schematic illustration of a third exemplary multispectral or hyperspectral measuring device;

FIG. 7 shows an exemplary signal for a pixel, generated from a spectral cell;

Throughout the Figures same reference numbers are used to denote same or similar elements. Moreover, a list of reference numerals and corresponding explanations are provided in Table I.

DETAILED DESCRIPTION

Figure 1:
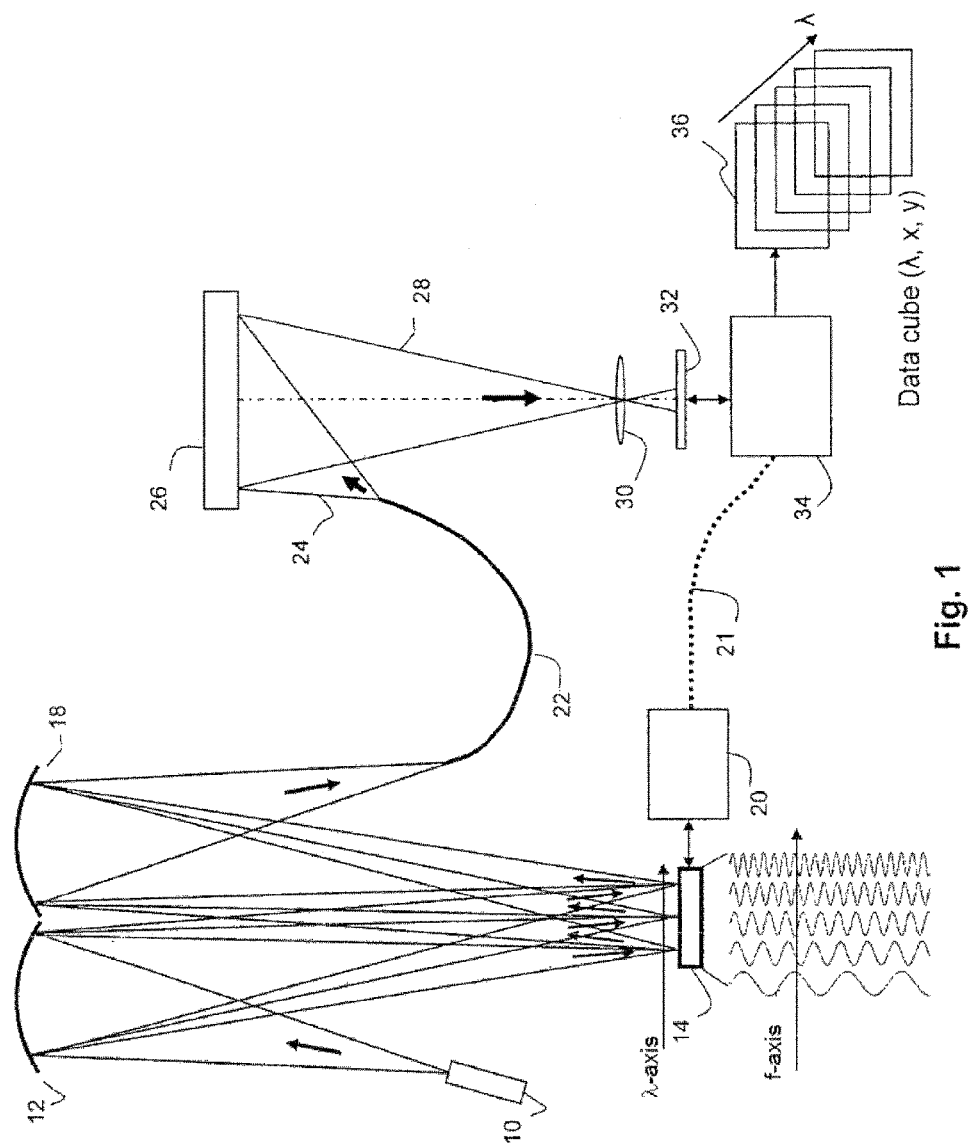
FIG. 1 shows a schematic illustration of a first exemplary device for multispectral or hyperspectral imaging.

FIG. 1 shows the basic structure of a first exemplary device for multispectral or hyperspectral imaging.

Electromagnetic radiation of a light source 10, e.g. a light source having a continuous or quasi-continuous spectrum or a light source having a frequency comb spectrum (e.g. a frequency comb laser or an SLD with downstream FPI) is spectrally split by first dispersive means 12 (a curved diffraction grating in this example) such that, in a predetermined plane (in the following referred to as plane "S") or in a predetermined spatial region, the individual spectral components are substantially spatially separated from each other. In this plane, or in this spatial region, a spectral axis can be defined (also referred to as wavelength axis WA or λ axis). The different spectral components of the original continuous spectrum are arranged so as to be spatially separate from each other along said axis (λ axis). In other words: The spectral axis is the axis along which the spectrum is split according to wavelength or color.

Preferably, the light source 10 has a luminosity as high as possible, which increases the spectral resolution. The light source 10 can be a line source or a spotlight. The light source can be a source within the ultraviolet spectral range (extreme, deep and weak ultraviolet, i.e. EUV, DUV, UV), the visible spectral range (VIS), the infrared spectral range (near, mid, and far infrared, i.e. NIR, MR, FIR), or the Terahertz spectral range.

A two-dimensional, electrically controllable spatial light modulator (SLM) 14 is arranged in the plane "S". The spatial light modulator 14 comprises a plurality of individually controllable SLM elements which are arranged in lines and/or columns. Thus, the spectral axis lies on the electrically controllable spatial light modulator 14, or in the plane of the light modulator 14, respectively. Preferably, the direction of the spectral axis is either in the direction of the columns or in the direction of the lines of the light modulator 14. For example, a digital mirror device (DMD), a liquid crystal display (LCD), a liquid crystal on silicon (LCoS), etc. can be used as electrically controllable spatial light modulators. Preferably, a DMD is used as the light modulator 14, because DMDs have a very good light efficiency with respect to the light modulating elements. In case the light source 10 is a frequency comb laser or an SLD with downstream FPI, the frequency laser or the SLD, etc. preferably is configured such that one line at a time is incident on at least one distinct SLM element. Preferably, each line of the frequency comb is incident on 2 or 3 SLM elements. Preferably, the frequency comb laser or the SLD has about 100 lines when applied in the used spectral range.

The spatial light modulator 14 can be connected to a computer 20, or an SLM controller for controlling the light modulator 14, and in particular for frequency control of the individual spectral components, e.g. by means of pulse-width modulation. The spatial light modulator 14 and the sub-computer 20 can be integrated in one module. The spatial light modulator and the computer 20 are parts of the modulation device.

Then, the individual spectral ranges, or spectral components, are time-encoded in the direction of the spectral axis, e.g. they are frequency modulated, e.g. by means of a pulse-width modulation. For example, the range of longer waves (e.g. red) can be modulated with the modulation frequency of 10 Hz, whereas the range of shorter waves (e.g. blue) is modulated with the modulation frequency of 30 Hz. Time encoding (e.g. frequency modulation) of the individual spectral components is accomplished by corresponding encoding, or modulation, of the electrically controllable spatial light modulator 14 along an axis (f-axis) substantially parallel to the spectral axis. Along the spectral axis, or f-axis, of the electrically controllable spatial light modulator 14, the frequency can change in blocks of combined columns or rows by a certain amount (e.g. by 1 Hz). For example, the first block can be modulated with the frequency of 10 Hz, the second one with a frequency of 11 Hz, . . . , and the last block can be modulated with a frequency of 30 Hz.

The individual time modulated spectral components are re-combined, or re-composed, such that a multispectral or hyperspectral light having an addressable spectrum 24 is created. Combination of the individual spectral components can be accomplished by means of second wavelength-dispersive optical means 18 (e.g. diffraction gratings, prisms, etc.). The second dispersive optical means are configured to compensate the angular difference of the individual spectral components introduced by the first dispersive means 12, and the spatial separation of the individual spectral components introduced by the first dispersive means, respectively.

The multispectral light 24 can be coupled into an optical fiber 22 and can serve, e.g. as spot light source illumination of an object 26. Guiding the multispectral light toward the object 24 can also be accomplished via other suitable optical means (such as beam splitters, mirrors, lenses, etc.). At least part of the light coming from the illuminated object (e.g. reflected, transmitted or fluorescence light) is imaged by means of a suitable imaging optical system 30 (comprising e.g. a lens) on the chip of a camera 32 (e.g. a CCD camera, a CMOS camera, etc.). In principle, the imaging optical system 30 can be part of any imaging system, including a microscopic imaging system. Hence, the imaging optical system can comprise a camera lens and/or a microscope lens.

The camera 32 (as an example of the rasterized detector) acquires a sequence of two-dimensional images of the examined object, i.e. a series of images in different points in time following each other. The number of images in the acquired image batch can be chosen in accordance with the desired spectral resolution, wherein the desired spectral resolution also determines the degree of the frequency modulation. Preferably, the phase progression between two images directly following each other is "Pi" at maximum (observing the sampling theorem). Undersampling, however, is also possible if a-priori information is available. If the light source 10 is strong enough, the measured object 26 is cooperative (i.e. not substantially black or absorbing), and if the illumination and imaging optical systems are optimized accordingly, the camera 32 can run relatively fast, e.g. at a frame rate of 120 Hz. In the case of a very strong light source 10, for example in the form of a white light laser, even a high frequency camera having a frame rate in the single-digit kHz range can be used.

The camera 32 can be connected to a computer or a processor 34 which is capable of carrying out a pixel-by-pixel analysis of the obtained signal, and is optionally capable of controlling image acquisition through the camera 32. The computer 34 and the camera 32 can be integrated in a camera module. For example, the camera can preferably have "on chip intelligence", being capable of carrying out a pixel-by-pixel analysis of the obtained signal, i.e. of the intensity of the light incident on the camera chip. The analysis can be an FFT analysis, a wavelet analysis, a lock-in detection, etc.

The computer, or the processor 34 is configured to evaluate the signal modulations in each camera pixel by means of FFT (or other types of frequency analysis), and to discriminate the individual spectral components on the basis of the evaluation. Thus, a batch (data cube ($\lambda$, x, y)) of spectrally resolved two-dimensional images of the examined object, i.e. a multispectral or hyperspectral image 36 of the examined object is obtained.

In case of a batch of images containing e.g. 60 images, a modulation frequency of 30 Hz, a camera frame rate of 120 Hz with a scanning time of 0.5 s, the frequency resolution is about 1 Hz. In this case, about 20 spectral channels, or spectral components can be separated in practical use. In this case, the hyperspectral frame rate would be 2 frames per second, if the required computing power of the chip integrated in the smart camera (for FFT or other mathematic operations), or of the computer, or processor connected to the camera is sufficient.

Preferably, the electrically controllable, spatial light modulator 14, or the sub-sub-computer 20 for controlling the light modulator 14 is coupled with the camera 32 in terms of data and computing, such that there is a signal or a data connection 21, respectively, between the light modulator 14 and the camera 32. Preferably, the controller of the spatial light modulator 14 is synchronized with the controller of the camera 32. For example, the camera 32 can start acquisition of the image batch upon a start command. With the start commend, the spatial light modulator 14, too, can start periodic switching of the individual SLM elements, wherein the switching frequency along the spectral axis is subject to a frequency modulation, for example. In case of a periodic encoding, synchronization between the controller of the spatial light modulator and the CMOS camera 32 can be omitted.

For a 3D detection of structural and/or topographic object information, a chromatic-confocal system or a spectral interferometer can be used.

Figure 2:
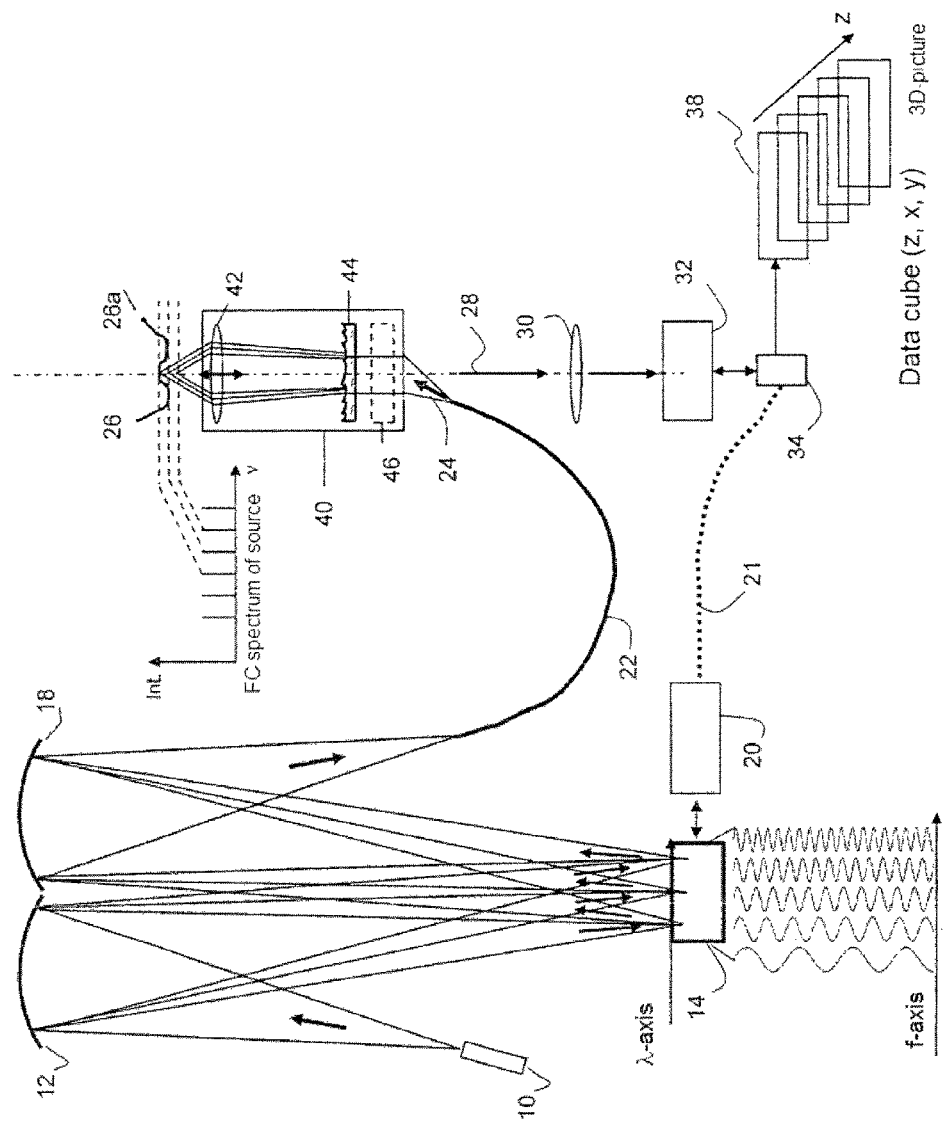
FIG. 2 shows a schematic illustration of a first exemplary multispectral or hyperspectral measuring device.

FIG. 2 shows the basic structure of a first exemplary multispectral or hyperspectral measuring device for acquiring structural and/or topographic information on an object. The basic structure of the measuring device corresponds to the structure shown in FIG. 1, with the exception of a chromatic-confocal system 40, or a spectral interferometer (not shown in FIG. 2) being arranged in the illumination beam path, or in the object space, respectively. The chromatic-confocal system 40 comprises at least one diffractive optical element (DOE) 44 for chromatic splitting of the multispectral light 24, or for chromatic depth splitting, an imaging lens 42, and optionally a system 46 for pixel image generation and a confocal discriminator having an imaging stage. Preferably, each spectral component addresses a unique depth, or a unique depth range in the object space. With the device shown in FIG. 2, chromatic-confocal spectral interferometry (CCSI) can be performed, too, in particular in combination with a Fabry-Pérot interferometer.

A spot light source illumination in the object space of the chromatic-confocal measuring device 40 is carried out with the modulated spectral light 24. The light 28 reflected at the object 26 (for example the tooth stump 26a) is imaged and detected on the camera chip through the imaging optical system. Following a pixel-by-pixel analysis of the acquired image batch, a discrimination of the individual spectral components, and an assignment of the individual spectral components of certain depths or depths ranges, a three-dimensional image 38 (data cube (z, x, y)) of the examined object 26, or 26a, can be obtained. Further, the spectral information available can be additionally used for determination of the color of an object, e.g. of a tooth stump 26a.

In terms of data, the above solution is a Fourier processor and can be compared to a two-beam interferometer (ZI). The present solution, however, is much easier and more stable in technical terms than a scanning two-beam interferometer, due to the use of an electronically controllable spatial light modulator 14. The smaller spectral resolution as compared to a scanning two-beam interferometer which usually is present in this solution does not constitute a disadvantage in many technical applications (e.g. in hyperspectral imaging with as much as 20 spectral channels).

In the optical systems shown in FIGS. 1 and 2, the multispectral light source comprises a polychromatic light source 10 having a continuous or quasi-continuous spectrum (white light source) and wavelength-dispersive optical means 12, such as diffraction gratings, for spatial splitting of the individual spectral component. The multispectral light source can, however, also comprise a plurality of discrete monochromatic or quasi-monochromatic light sources, as shown in FIGS. 3 to 5.

Figures 3, 4:
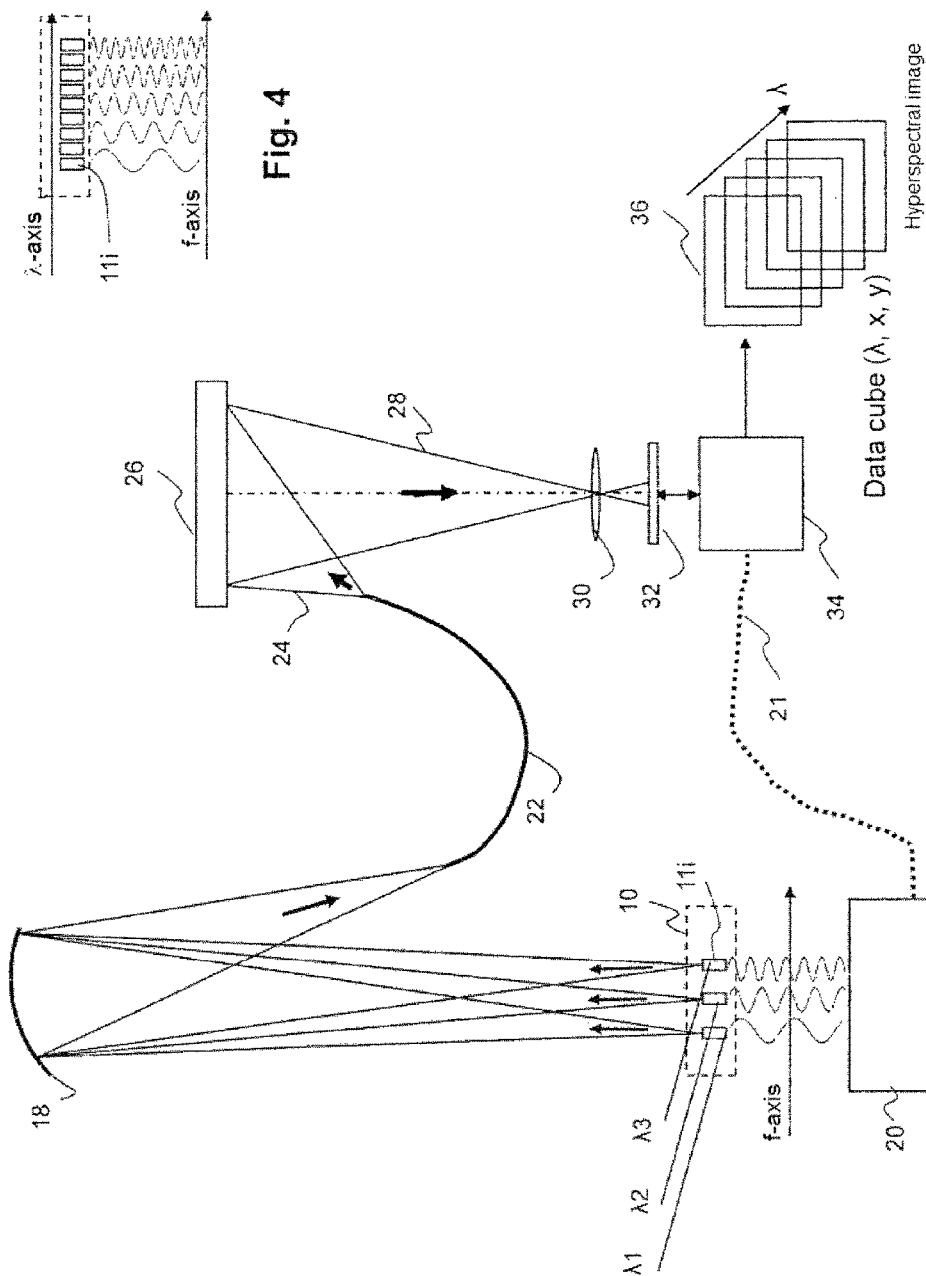
FIG. 3 shows a schematic illustration of a second exemplary device for multispectral or hyperspectral imaging.
FIG. 4 shows an exemplary modulation of the spectral components.

In particular, FIG. 3 schematically shows a second exemplary device for multispectral or hyperspectral imaging. The basic optical structure of this exemplary device substantially corresponds to the structure of the device shown in FIG. 1, the only difference being that the multispectral light source comprises an array of discrete, or rasterized, individually controllable monochromatic or quasi monochromatic individual sources 11$i$. The individual sources emit light having predetermined, mutually different emission focus wavelengths $\lambda_1, \lambda_2, \ldots, \lambda_n$ or emission focus wavelength bands. The modulation device comprises a plurality of electronic control modules, assigned to the individual sources 11$i$, and a computer or other control means (controller) for frequency control, or frequency modulation, of the light emitted by the individual sources 11$i$, i=1, 2, . . . . The modulation can be a pulse-width modulation, for example, as shown in FIG. 4. The control modules and the computer, or controller, 20 are parts of the modulation device.

FIG. 4 shows the frequency modulations (see f-axis) of the spectral lines emitted by the individual light sources and having different wavelengths $\lambda$. As shown in FIG. 4, the individual lines of the array light source with controllable individual sources can be discretely modulated in the pulse width (modulation frequency). Modulation can also be aperiodic. Preferably, the initial phases of the individual modulations (harmonic oscillations) can be different in order to limit the required dynamic range of the CMOS camera for acquisition of the sum signal. Therein, a sum signal can be generated with chirp effect, which usually results in reduced signal maxima of the sum signal.

Figure 5:
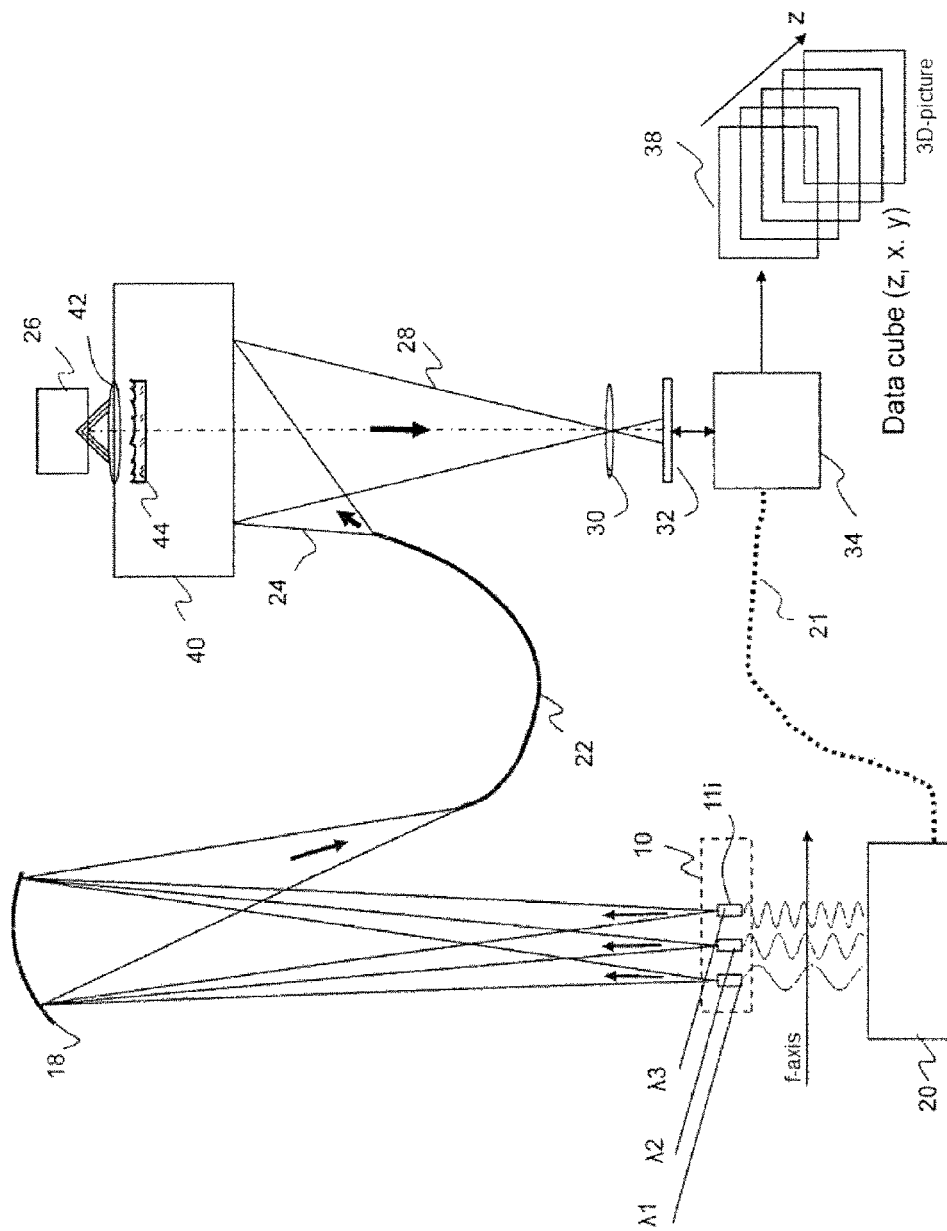
FIG. 5 shows a schematic illustration of a second exemplary multispectral or hyperspectral measuring device.

FIG. 5 shows a schematic illustration of a second exemplary multispectral or hyperspectral measuring device. The basic optical structure of this exemplary device substantially corresponds to the structure of the measuring device shown in FIG. 2, the only difference being that—as shown in FIG. 3—the multispectral light source comprises an assembly or an array of discrete, individually controllable monochromatic or quasi monochromatic individual sources 11$i$ which are configured to emit light having predetermined, mutually different emission focus wavelengths $\lambda_1, \lambda_2, \ldots, \lambda_n$ or emission focus wavelength bands.

In particular, the multispectral light source can be a rasterized high-energy light source for scene or object illumination which has (very) many individual light emitting elements, e.g. 1064 (32×32) micro LEDs arranged in a square. The LEDs can have, for example, 8 different colors (e.g. 8 micro-LED types of different colors, uniformly distributed in the matrix). In one example, the same modulation frequency (preferably harmonic oscillation) is applied to all the micro LEDs having the same color (mid wavelength) via electronic controlling. Thus, there are 8 different predetermined (exactly known) harmonic modulation frequencies. The starting phase of the modulations can be slightly varied in order to limit the signal dynamics in the sum signal to some extent.

This rasterized high-energy light source having 8 colors can diffusely illuminate a scene or an object, for example. This can be accomplished by Köhler illumination, for example. What is important, however, is that light of each color is present in the pupil of the illuminating device for the object/scene, and is also distributed as good as possible therein. Each point of the object is thus illuminated with light of each of the 8 colors from many illumination directions. For example, the camera, which may be formed as a camera having a frame rate of 120 Hz, takes 48 images of the scene thus illuminated, and can pixel-by-pixel determine the color combination in each pixel, e.g. by means of an FFT of the sum signal. Thus, there is an illumination and camera arrangement having 8 color channels.

This solution does not require the spatial light modulator. Modulation is accomplished already by controlling the micro LEDs of the same color in the light source array. Further, wavelength-dispersive means are not needed because the individual different-color light elements (micro LEDs in an array) are already spatially distributed and can be separately modulated (e.g. different modulation frequencies and/or different starting phases) by suitable four-channel controlling technology (at least one channel for each color).

FIG. 6 shows a schematic illustration of another exemplary multispectral or hyperspectral measuring device. In this embodiment, the above illuminating device (comprising the light source 10 or the array of discrete monochromatic or quasi-monochromatic light sources 11$i$, the dispersive optical means 12, the spatial light modulator 14, the controller 20, and the dispersive optical means 18) is integrated in a multispectral or hyperspectral measuring device known from document DE 10 2006 007 172 B4 as a polychromatic light source 50 having an addressable spectrum.

The light emitted by the polychromatic light source 50 is coupled into an optical fiber 52 (e.g. a monomode fiber) and serves as a spot-light source illumination of a measuring device. The measuring device comprises a system for pixel image formation including a rasterized, two-dimensional array of micro-lenses and respective pinholes 56 assigned to the focus of each micro-lense, and an imaging stage comprising the lenses 54 and 58. Preferably, the rasterized, two-dimensional array is arranged to be distorted with respect to the spectral axis (λ-axis). The measuring system further comprises a beam splitter 60, a diffractive optical element 62, an imaging lens 64, and a mirror 68. The light 70 reflected at the object 26 is coupled into a spectrometric arrangement 80 by means of the beam splitter 60. The spectrometric arrangement comprises a prism 74, imaging optical system 76, and a camera 32 having a two-dimensional rasterized camera chip. Further, the spectrometric arrangement may comprise a second system for pixel image formation 72 including a second array with imaging stage for confocal discrimination.

As described above, a sequence of two-dimensional images (for example in the form of an image batch) is acquired. The profile of the intensity "I" can be determined as a function of the wavelength λ by means of a pixel-by-pixel analysis for each pixel, or for each spectral line. FIG. 7 shows an exemplary signal (the intensity of the detected light as a function of the wavelength) for one pixel, which signal has been generated from a spectral line. On the basis of this signal, data on the three-dimensional profile (x, y, z) of the examined object can be obtained.

Figure 8:
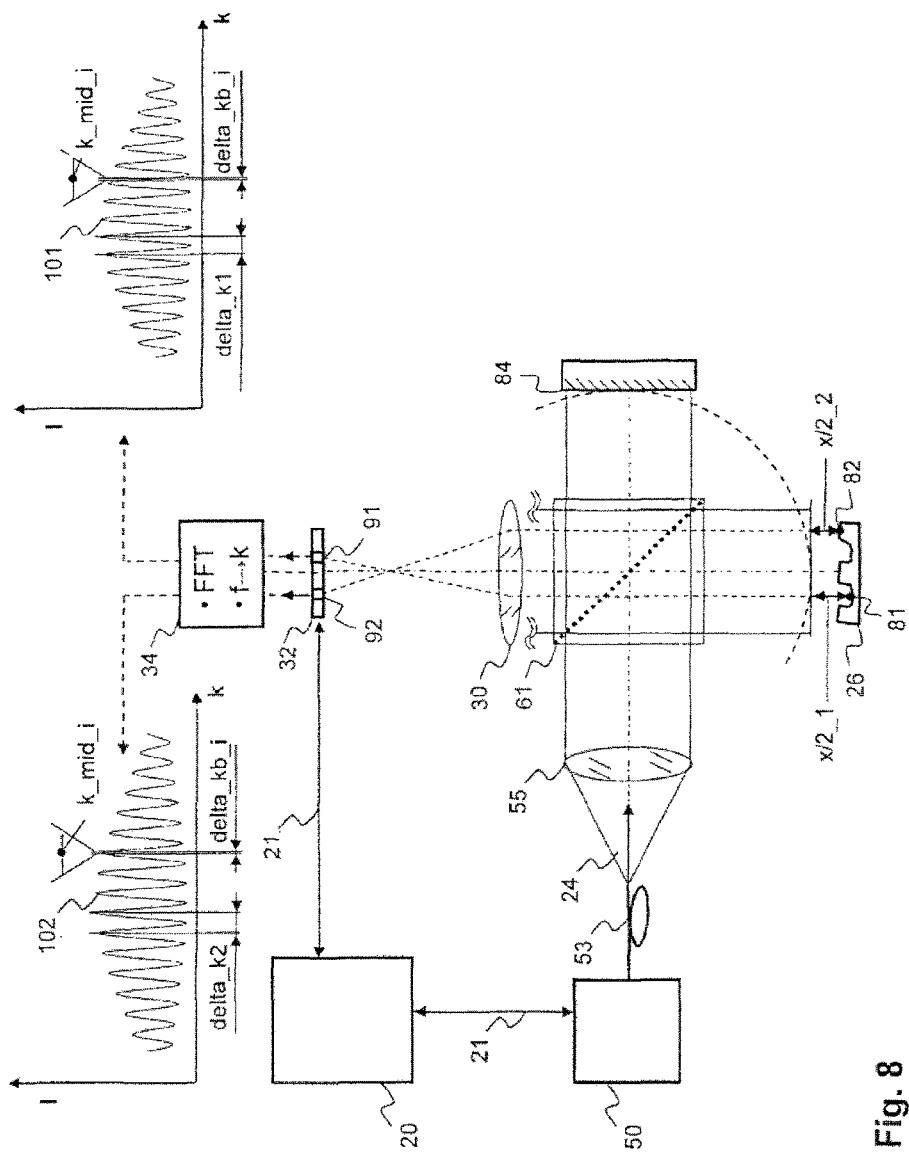
FIG. 8 shows a schematic illustration of a spectral interferometer.

FIG. 8 shows a schematic illustration of a spectral interferometer. Light coming from a multispectral light source 50 having an addressable spectrum exits in the form of a multispectral illumination bundle 24 through a multimode fiber 53. Herein, the light is low-frequency modulated in the multispectral light source 50 in dependence on the physical wave number k by means of spectral splitting components (not shown) and a controlled SLM as already described, wherein a unique frequency f_i is impressed on each narrow wave number band delta_kb_i in the spectrum of the multispectral illumination bundle 24 (within the dynamic possibilities of the SLMs and anytime below half of the image reading frequency of the camera 32). The illumination bundle 24 exiting the multimode fiber 53 is collimated by means of a collimator lens 55 and enters as spectral interferometer.

The spectral interferometer comprises an interferometer beam splitter 61, whereat beam splitting and beam combination is accomplished, a reference mirror 84, and an object 26, wherein there is an optical path difference different from zero in the spectral interferometer for all the object elements of said object 26. Herein only two microscopically small object elements 81 und 82 are considered, representative of the object 26, the positions thereof resulting in an optical path difference of x/2_1 and x/2_2 in the interferometer.

After having left the interfering bundles with the respective optical path differences, an at least approximately exact imaging onto the camera 32 is accomplished via the imaging optical system 30, wherein one respective image of one respective object element 81, or 82, is generated on one respective pixel 91, or 92, of the camera 32. An image batch is acquired by the camera 32 over a period of time delta_t. The camera data enter the main computer 34, where a frequency analysis (f_i) is carried out in a pixel-by-pixel manner by means of a fast Fourier transform (FFT), wherefrom an assignment of the calculated frequencies in the f-space to the wavelength bands is effected via a look-up table, wherein the wavelength bands are reach represented by an average discrete wave number k_average_i. Thus, one wavelet 101, or 102, with intensity values at discrete wave numbers is calculated for each of the observed object elements 81 und 82, respectively. The value of wave number distance delta_k1 and delta_k2, respectively, of the wavelets 101 and 102 contains the information on the optical path difference x/2_1 and x/2_2, respectively, of the object elements 81 and 82, respectively, which can be calculated from the associated wavelet 101 or 102, respectively, in a known manner, for example by means of a fast Fourier transform. The height profile of the object 26 can then be determined from the calculated values of the optical path difference for all object elements which are each represented by a pixel of the camera 32 and from each of which a wavelet or a wavelet-like signal has been obtained from the image batch data.

Figure 9:
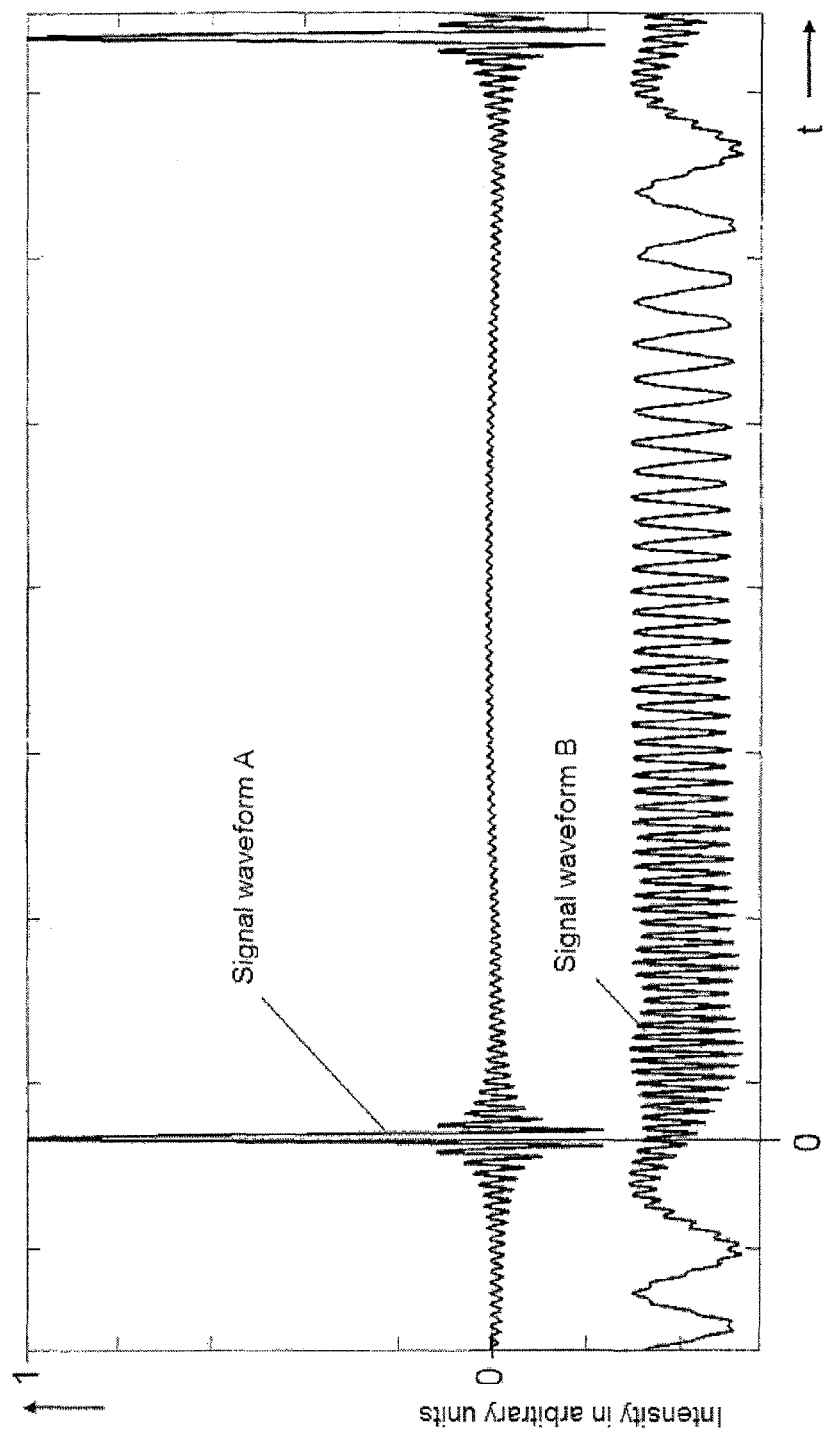
FIG. 9 shows an exemplary dynamics reduction in the signal waveform by means of non-linear variation of the starting phases.

FIG. 9 shows two simulated signal waveforms A and B over the time as sum signals of harmonic oscillations. In the signal waveform A, the starting phase of each harmonic oscillation each time has the value zero. In the signal waveform B, the starting phases of the harmonic oscillations are specifically varied. To this end, 100 cos-signals having the frequencies 3 Hz, 6 Hz to 303 Hz in steps of 3 Hz in each case and having the same amplitude "a" in each case where summed upt in a time range of approximately 0.4 s.

In signal A, the starting phases of all the 100 cos-signals are set to zero, whereby the known waveform for a short-coherence interferogram results with signal waveform A. Herein, the constant part of the signal is split off in each case. This case is typical of alternating-light detectors in the infrared range. The signal waveform A has a high mid maximum which must be processed by a detector herein. For better visibility, the signal waveform B is shown in FIG. 9 as shifted downward. Herein, the oscillations likewise take place about the intensity value of zero. In the signal waveform B, the starting phases in the argument of the 100 cos-function assume different values. These are likewise frequencies around the frequencies 3 Hz, 6 Hz to 303 Hz in steps of 3 Hz each time. In the signal waveform B, too, the amplitude of all the oscillations is "a". The starting phases of the oscillations are formed by means of a quadratic function, which satisfies the following formation rule:

Pi*$i$*$i$/100, wherein $i$=1,2, . . . 100.

Thus, the starting phases of the oscillations result for B as a sequence:

(1,2,4,9,16,25, . . . 10000)*pi/100.

Summing-up of the 100 cos-functions, each having a different starting phase, according to the formation rule yields the signal waveform B. This signal waveform B does not show any recognizable mid maximum, and thus requires a detector having a lower dynamic range as compared to detection of the signal waveform A, in the case of a spectrum having broad band characteristics and comparatively moderate modulation of amplitudes. In the mid region of signal waveform B, an increasing reduction of the signal frequency can be recognized. Therefore, signals having such characteristics are also referred to as signals with chirp effect. If the frequencies of all the cos-oscillations are known and if the starting phases are known, the skilled person can calculate the frequency spectrum from a signal waveform B, even if the amplitudes "a_i" of the individual harmonic oscillations are unknown because these represent the measured variable. If shares of the electromagnetic spectrum are frequency-encoded (e.g. by means of spatial light modulators or directly by means of control modules) and if a camera is used which is synchronized correspondingly, acquisition of an image batch is accomplished according to one of the above described embodiments. From this image batch, a signal waveform can be generated for each image measurement point in the time range, from which a spectrum can be calculated over the frequency f with f in Hz. Since in the method a modulation frequency f_is unambiguously assigned to each range of a wave number k with k in 1/cm in the sought electromagnetic spectrum, assignment of the calculated intensities to the wave number k is finally effected such that the result contains the sought electromagnetic spectrum as the distribution of the intensities over the wave number k.

Figure 10:
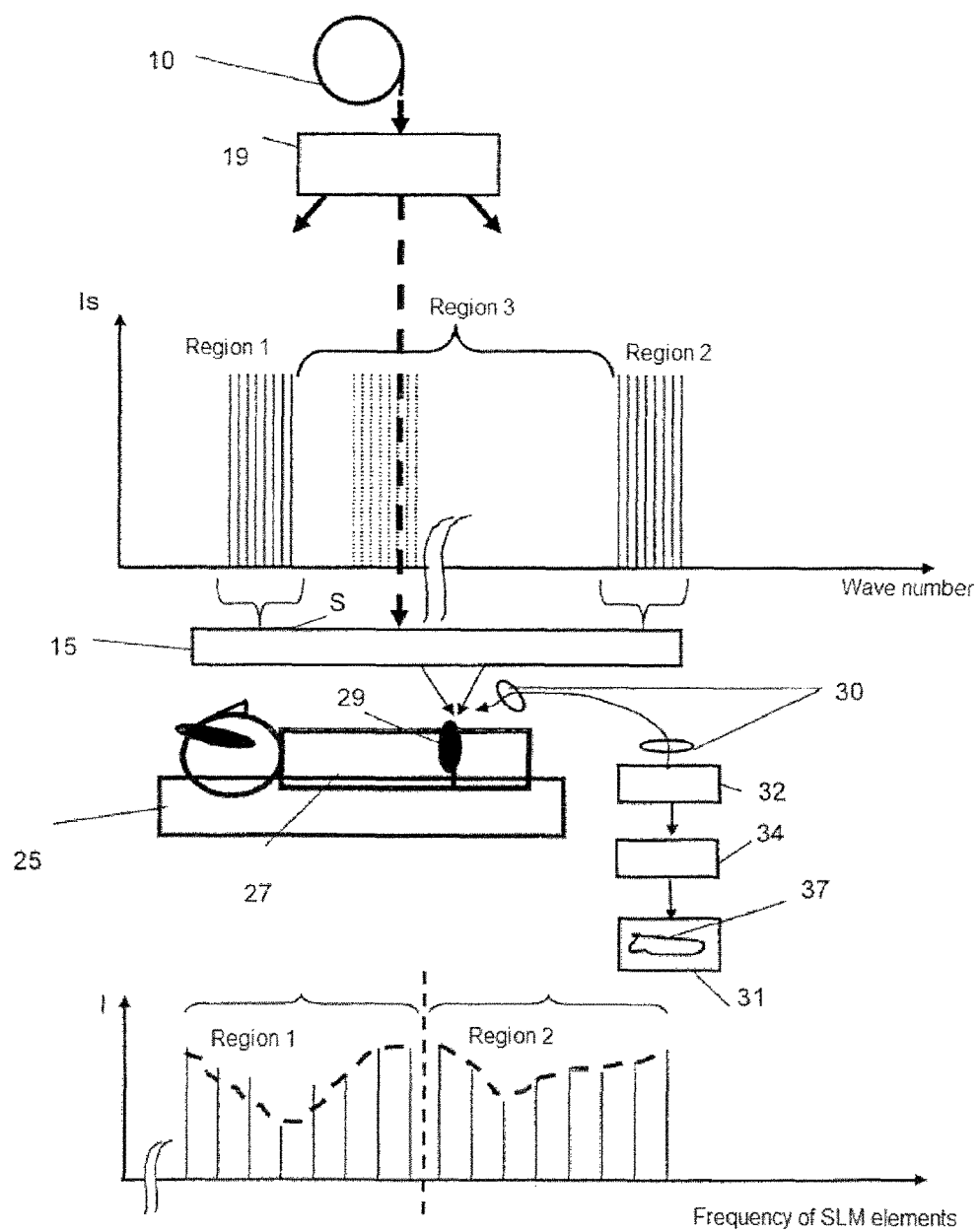
FIG. 10 shows a schematic illustration of a hyperspectral imaging and/or measuring device for use in surgery.

FIG. 10 schematically shows an imaging and/or measuring device for use in surgical interventions.

The device comprises a brilliant light source 10, preferably a light source having high spatial coherence. The light source can generate wide-band infrared radiation, in particular infrared radiation in the mid-infrared spectral range (MIR). The light source 10 can be a synchrotron light source, for example. Therein the wide-band infrared radiation is provided by synchrotron radiation by means of a beam line which extracts MIR radiation from the storage ring of a synchrotron, as for example described in the publication by Giuseppe Bellisola, Claudio Sorio, "Infrared spectroscopy and microscopy in cancer research and diagnosis", Am J Cancer Res 2012; 2(1): 1-21 www.ajcr.us/ISSN:2 156-6976/ajcr000085 [103]. Alternatively, the light source can comprise a plurality of lasers emitting in the MIR.

The radiation is supplied to a device for high-resolution spectral splitting 19 by means of optical means which are not shown herein. According to FIG. 1, the device for high-resolution spectral splitting 19 can be configured with diffraction gratings 12 and 18, in the form of a spectrometer with precise wave-number calibration. The device for high-resolution spectral splitting 19 can, for example, be a high-resolution grating spectrometer having a conventional structure.

Preferably, certain spectral ranges are selectively chosen for further addressing from the light emitted from the source. In the example shown in FIG. 10, two spectral ranges are chosen: range 1 and range 2. The device for high-resolution spectral splitting 19 physically provides also all the narrow spectral bands lying between and—depending on the design—also spectral ranges above or below the addressed narrow spectral bands. Those narrow spectral bands and spectral ranges above or below the addressed spectral bands and spectral ranges that are not addressed can be filtered out by suitable means and can be excluded from the further optical path toward the patient in the best possible way. For example, the spectral ranges not selected (e.g. range 3 in FIG. 10) can be directed to light traps, absorbers (or be "blanked").

Each of the two selected spectral ranges 1 and 2 comprises a plurality of respective individual spectral components (e.g. in the form of narrow spectral bands). The radiation from the brilliant light source 10 of high spatial coherence can, for example, be spectrally split into the following spectral components:

Range 1:
1078.0 cm$^{-1}$
1078.5 cm$^{-1}$
1079.0 cm$^{-1}$
1079.5 cm$^{-1}$
1080.0 cm$^{-1}$
1080.5 cm$^{-1}$
1081.0 cm$^{-1}$
1081.5 cm$^{-1}$
1082.0 cm$^{-1}$
Range 2:
1234.5 cm$^{-1}$
1235.0 cm$^{-1}$
1235.5 cm$^{-1}$
1236.0 cm$^{-1}$
1236.5 cm$^{-1}$
1237.0 cm$^{-1}$
1237.5 cm$^{-1}$
1238.0 cm$^{-1}$ The above ranges 1 and 2 are two "tumor marker bands" known from literature (see e.g. P. Ventkatachalam, L. Lakshmana Rao, N. Krishna Kumar, Anupama Jose, Shaiju S. Nazeer: "Diagnosis of Breast Cancer based on FT-IR-Sepctroscopy." In AIP Conf. Proc. 1075, 144 (2009) doi 10.1063/1.3046 195). Depending on the application, other spectral ranges and/or other spectral components can also be selected. For example, the article by So Yeong Lee, Kyong-Ah Yoon, Soo Hwa Jang, Erdene Ochir Ganbold, Dembereldorj Uuriintuya "Infrared spectroscopy characterization of normal and lung cancer cells originated from epithelium." in Journal of Veterinary Science. J. Vet. Sci. (2009), 10(4), 299-304, DOI: 10.4142/jvs.2009.10.4.299, describes that the spectral range around 970 cm$^{-1}$ is suited for the detection of lung cancer.

It is further possible to select a greater number of spectral ranges and/or spectral components. For example, up to 100 spectral tumor markers from the wide-band radiation of the light source in mid-infrared, for example from 900 cm$^{-1}$ to 1400 cm$^{-1}$, can be used. Evaluation of a higher number of spectral ranges and/or spectral components can increase measurement accuracy. Usually, in many cases a relative low number of addressed narrow spectral components (e.g. less than 64) is sufficient.

The "spectral tumor markers", or "tumor marker bands" can, e.g., be obtained under defined conditions directly from the patient during a surgical, invasive preliminary examination of tissues of different states (benign, premalignant to malignant), and can be unambiguously classified in several classes by means of histopathological tissue examination. The "spectral tumor markers" can, for example, be stored in a database or in the memory of a central computer 34. Preferably, the "spectral tumor markers" are made available during the surgical intervention in an automated manner in the central computer 34, or are accessible for the expert on demand in the background on the central computer for comparison with unknown tissue under the conditions of a surgical intervention.

Spectral splitting of the respective spectral ranges selected is accomplished in the plane S which can also be a slightly curved area. FIG. 10 shows the distribution of the intensity $I_S$ in the area of splitting (plane S) as a function of the wave number.

An SLM block 15 is arranged in the plane, or area of spectral splitting of the device for high-resolution spectral diffraction 19. The SLM block 15 can comprise two (or more) SLMs which are spatially separated in the plane, or area, S. In the present example, a spatial light modulator (SLM) is assigned to each of the selected ranges (ranges 1 and 2 in the present example), said SLM being optimized for the MIR spectral range by means of gilding of the elements, for example. Alternatively, ranges on one single SLM can be used that are spaced far from each other. This is in particular depending on the difference of the wave numbers of the addressed ranges. Suitable, preferably miniaturized mirror arrangements can be used for guiding, or directing, the light from two ranges which are distinctly separated in lateral direction onto one single SLM.

Preferably, spectral splitting (resolution power) is accomplished such that a unique harmonically oscillating element of the SLM can be unambiguously assigned to each of the above narrow spectral bands, or each of the spectral components. The available frequency range of the SLM can be correspondingly divided in individual frequency ranges when controlling the SLM.

In one example, each of the ranges 1 and 2 (e.g. the ranges about 1080 $cm^{-1}$ and 1236 $cm^{-1}$, respectively, which are known as "spectral tumor markers") comprises 8 different spectral components, and correspondingly only 8 elements of each SLM are "connected through". In this example, the focus wavelength can shift from SLM element to SLM element by 0.5 $cm^{-1}$ in each case. The individual spectral components can, for example be distributed to the modulation frequencies:
20 Hz, 22 Hz, 24 Hz, 26 Hz, 28 Hz, 30 Hz, 32 Hz, 34 Hz, 36 Hz, 38 Hz, 40 Hz, 42 Hz, 44 Hz, 46 Hz, 48 Hz, 50 Hz.

After start of the process for measuring/examining organic tissue, the SLM elements of the SLMs in the SLM block 15 oscillate, e.g. from 20 Hz to 50 Hz, wherein the frequency is higher by 2 Hz from a respective SLM element to the adjacent SLM element in each case. An oscillation frequency which is higher by 2 Hz can also be set between the 8$^{th}$ SLM element and the 9$^{th}$ SLM element in the SLM block 15. This is, however no stringent requirement. Further, the starting phases of the oscillations can be differently distributed. The frequencies, the focus wavelength, and the starting phases, if applicable, on each SLM element are stored in the central computer 34.

Each spectral component is modulated by one element of the spatial light modulator with the frequency assigned thereto. Therefore, the spread in the frequency range of modulation is much higher than in the range of the physical wave numbers. In this case, however, relatively low energy efficiency is accepted. Therefore, use of a brilliant light source is required in this case. All in all, only a comparatively small amount of the MIR radiation emitted by the light source reaches the patient, namely the radiation which has been determined to be best suited for detecting cancer, etc., on the basis of preliminary examinations with calculation, or compilation of patient-related "tumor markers". Here, the brilliant light source can run at "full load" without exposing the patient to an unnecessarily high extent.

The addressed multispectral infrared measuring radiation is guided to the examined organic tissue 29 of the patient 27 on the operating table 25. The optical means for introducing the infrared measuring radiation into the organic tissue are not shown in FIG. 10. Any suitable means, for example in the form of a measuring probe can be used. The imaging optical system 30 guides the MIR radiation coming back to a detector. The detector can be a so-called "focal plane detector", for example an MIR camera 32. Alternatively, the detector can be a single-point detector, e.g. a cooled highly sensitive mercury-cadmium-telluride detector for radiation in the MIR, such that only a small point in the tissue is detected. The mercury-cadmium-telluride detector can detect oscillating radiation which may lie in the range of up to several 100 Hz or even more. In this case, an image of the examined organ can be obtained by scanning.

An image batch is acquired by means of the MIR camera 32 (or other suitable detectors). If, for example, measurements are made with 16 discrete frequencies for 1 s at a frame rate of 120 frames per second, and an image batch of 120 images is acquired, the intensity/energy in the oscillation of each one of the 16 individual frequencies can definitely be determined, or calculated using a lock-in detection. Therein, the starting phases can differ. The scanning theorem for signal scanning is thus satisfied, and the individual oscillations are separable, e.g. by means of lock-in detection, fast Fourier transform (FFT), etc.

As the lock-in detection, FFT analysis, etc. is applied to the few (e.g. 16) addressed frequencies only, the measuring process can be executed very quickly while still obtaining sufficient accuracy. A higher number of different addressed spectral components, or frequencies, can improve the accuracy and the significance of the measurement. Generally, 256 addressed frequencies, or spectral components, are sufficient for spectrally covering an assembly of tumor markers (e.g. 32), and for achieving adequately high significance.

FIG. 10 shows the intensity I calculated by the computer 34 using MIR camera-image pixels, for the two spectral ranges 1 and 2 as a function of the frequency of the SLM elements, or the modulation frequency, respectively. The determined intensity—after corresponding calibration and with the help of reference measurements—allows for precisely drawing conclusions on the degree of absorption for each spectral component of the above regions 1 and 2. Thereby, the absorption ratio can be determined with sufficient accuracy.

In particular, conclusions regarding the examined tissues can be drawn from the ratio of the intensities of the two regions 1 and 2 alone. In practical use, however, a higher number of spectral components is addressed, i.e. usually a complex wavelet, in order to be capable of obtaining reliable results, preferably in operation real time, on the condition of organic tissue with accountable decisions for a surgical intervention. It is also possible, to subsequently address different wavelets, which were previously obtained especially from the tissue-types "benign", "premalignant", and "malignant", as well as from further classifications. Reliable results can be obtained by means of correlation technologies with stored reference spectra.

Reliable results can be obtained in particular if a plurality of patient-related data (spectral data and other, also multimodal data) are available which were obtained under clearly defined conditions and not too long ago. In this case, the available data constitute the reference, e.g. as a catalogue of categories for classification of tissue, which is also histopathologically confirmed, for spectral data obtained under surgery conditions. The aim is to be in a position to possibly omit histopathological confirmation under the conditions of a surgical intervention.

A map 37 of the spatial distribution of the different tissue types can, for example, be shown to the team of surgeons on a display 31. In the simplest case, the information is transformed by optical means into a decision "cancer yes/no" upon optical scanning of tissue during the surgical intervention.

The above-described solution of selective frequency spread can be extended also to a plurality of ranges ("tumor marker bands"). As described above, it is not necessary to stringently use a new SLM for each range in any case.

Another solution is provided by time-sequential wavelength tuning by means of SLM in a device for high-resolution spectral splitting. A single narrow-band radiation is used in this case. As this solution requires particularly high luminosity of the radiation, this solution usually is inferior to the solution using a plurality of narrow-band lines as regards the achievable signal-to-noise ratio.

Further examples of the present invention comprise:
1. A method of adaptive hyperspectral imaging and/or of detection of the distance, the 2D or 3D profiles by means of spectroscopy, or of spectral modulation of radiation in space and time with dynamic reduction, in particular also for medical applications, including the following means:

either a multispectral source of electromagnetic radiation 10, and wavelength-dispersive optical means 12 downstream thereof, and at least one electrically controllable spatial light modulator 14;

or an arrangement or an array of monochromatic or quasi-monochromatic sources 11$i$, I=1, 2, . . . of electromagnetic radiation each having a predetermined mutually different emission focus wavelength $\lambda 1$, $\lambda 2$, . . . or a different emission focus wavelength band, including one or more associated electronic control modules 20 for the sources 11$i$, and a rasterized detector 32 with associated computer or computer system 34, or a rasterized detector system with at least one associated computer or computer system, wherein the method is characterized in that either with the multispectral light source 10, a spectral splitting is performed in a two-dimensional or three-dimensional region by means of the wavelength-dispersive means 12 provided downstream, and thus there is either at least one lateral wavelength axis (WA; $\lambda$-axis) or a preset laterally structured range of intensities having different wavelengths, and in the two-dimensional or three-dimensional region varying application of the electromagnetic radiation, using one or more controllable spatial light modulators 14, is laterally performed therein, even aperiodically, with a preset controlled degree of reflection and/or degree of transmission and/or degree of absorption with a preset controlled time-modulation, and for the different components—differing in the physical wavelength of the electromagnetic radiation—different time modulations are performed in the basic frequency or in a comparatively narrow basic frequency band (wherein harmonic waves can be generated, too) within a frequency range, but always below a frequency of 10 MHz, are performed for the basic frequency or for the basic frequency band, and the components of the electromagnetic radiation which differ in the physical wavelengths after application are at least approximately spatially re-combined to form multispectral electromagnetic radiation using optical means 18, an addressed spectrum of electromagnetic radiation 24 being formed thereby, or that with an arrangement or an assembly of monochromatic or quasi-monochromatic (discrete or array) sources 11 of electromagnetic radiation having predetermined mutually different emission focus wavelength $\lambda 1$, $\lambda 2$, . . . or emission focus wavelength band with one or more associated electronic control module, a frequency multiplexing is performed in a frequency range below a frequency of 10 MHz for the basic frequency or for the basic frequency band, or an aperiodic time encoding of the spectral channels is made, and that therein the radiation of each emission focus wavelength is subject to predetermined modulation, wherein harmonic oscillations may occur, and the components of the electromagnetic radiation which differ in the physical wavelengths are at least approximately spatially re-combined to form multispectral electromagnetic radiation 24 using optical means 18, an addressed spectrum of electromagnetic radiation 24 being formed thereby.

With the re-combined multispectral electromagnetic radiation 24, illumination of an object 26 or a scene is accomplished (i.e. with "white" light), and the addressed spectrum of electromagnetic radiation 24 is at least approximately applied to each object point. A two-dimensional detection of the electromagnetic radiation 28 coming from the object 26 is effected by means of the rasterized detector 32 having an associated computer or computer system 34, or by means of the rasterized detector system having at least one associated computer or computer system 34. Further, with the associated computer or computer system 34, an analysis of the time modulated components in the detected intensity for each detection element of the rasterized detector 32, and a modulation wavelength conversion by means of at least approximately a priori known assignment of wavelength or focus wavelength of the electromagnet radiation to a basic frequency or sequence of the modulation are carried out.

The modulation can be a periodic or an aperiodic modulation. Likewise, chirping can be performed. Preferably, a correlation with the impressed modulation is performed. The modulation can be effected laterally in space, in particular, the modulation can be effected with a linear variation of the modulation frequency.

The starting phases of the individual harmonic oscillations which are generated in the f-space by means of a controlled SLM, can differ from each other in a predetermined manner. Therein, the starting phases can also be formed (generated) according to a non-linear formation law above the frequency f, such that the sum signal recorded by the pixels of the rasterized detector exhibits a significant chirp effect, and the sum signal does not exhibit any significant maxima. This is advantageous for exploitation of the given dynamic range of a detector, or it reduces the demands on detectors dynamics from the start.

Preferably, a multi-bundle- (e.g. 8 bundles) to a single-bundle-coupling or a multi-fiber- (e.g. 8 fibers) to a single-fiber-coupling is realized.

Preferably, Fabry-Pérot filters are used for demodulation of the spectral wavelets in the frequency space.

Further preferably, a frequency comb laser is used as a radiation source having a suitable distance of spectral lines in the spectrum, wherein each spectral line preferably addresses a unique depth in the object space during distance, profile, or 3D measurements.

2. An arrangement for adaptive hyperspectral imaging and/or detection of the distance, the 2D or the 3D profile using spectroscopy, or for spectral modulation of radiation over space and time with dynamic reduction, in particular also for medical applications comprises:

either a multispectral source of electromagnetic radiation 10, and wavelength-dispersive optical means 12 downstream of said source 10, and at least one electrically controllable spatial light modulator 14;

or an arrangement or an array of monochromatic or quasi-monochromatic sources 11$i$, i=1, 2, . . . of electromagnetic radiation each having a predetermined mutually different emission focus wavelength $\lambda 1$, $\lambda 2$, . . . or a different emission focus wavelength band, including one or more associated electronic control modules 20, and a rasterized detector 32 with associated computer or computer system 34, or with a rasterized detector system with at least one associated computer or computer system, characterized in that either with the multispectral light source 10, a spectral splitting is performed in a two-dimensional or three-dimensional region by means of the wavelength-dispersive means 12 provided downstream, and thus there is either at least one lateral wavelength axis (WA; $\lambda$-axis) or a preset laterally structured range of intensities having different wavelengths, and in the two-dimensional or three-dimensional region varying application of the electromagnetic radiation, using one or more controllable spatial light modulators 14, is laterally performed therein, even aperiodically, with a preset controlled degree of reflection and/or degree of transmission and/or degree of absorption with a preset controlled time-modulation, and for the different components—differing in the physical wavelength of the electromagnetic radiation—time modulations differing in the basic frequency or in a comparatively narrow basic frequency band (wherein harmonic waves can be generated, too) within a frequency range, but always below a frequency of 10 MHz, are performed for the basic frequency or for the basic frequency band, and the components of the electromagnetic radiation which differ in the physical wavelengths after application are at least approximately spatially re-combined to form multispectral electromagnetic radiation using optical means 18, an addressed spectrum of electromagnetic radiation 24 being formed thereby, or that with an arrangement or an assembly of monochromatic or quasi-monochromatic (discrete or array) sources 11 of electromagnetic radiation having predetermined mutually different emission focus wavelength $\lambda 1$, $\lambda 2$, . . . or emission focus wavelength band with one or more associated electronic control module, a frequency multiplexing is performed in a frequency range below a frequency of 10 MHz for the basic frequency or for the basic frequency band, or an aperiodic time encoding of the spectral channels is made, and that therein the radiation of each emission focus wavelength is subject to predetermined modulation, wherein harmonic oscillations may occur, and the components of the electromagnetic radiation which differ in the physical wavelengths are at least approximately spatially re-combined to form multispectral electromagnetic radiation 24 using optical means 18, an addressed spectrum of electromagnetic radiation 24 being formed thereby.

With the re-combined multispectral electromagnetic radiation 24, illumination of an object 26 or a scene is accomplished (i.e. with "white" light, or multispectral light of a desired addressed characteristics), and the addressed spectrum of electromagnetic radiation 24 is at least approximately applied to each object point. A two-dimensional detection of the electromagnetic radiation 28 coming from the object 26 is effected by means of the rasterized detector 32 having an associated computer or computer system 34, or by means of the rasterized detector system having at least one associated computer or computer system 34. Further, with the associated computer or computer system 34, an analysis of the time modulated components in the detected intensity for each detection element of the rasterized detector 32; and a modulation wavelength conversion by means of an at least approximately a priori known assignment of wavelength or focus wavelength of the electromagnet radiation to a basic frequency or sequence of the modulation are carried out.

Preferably, Fabry-Pérot filters are assigned to the 3D measuring arrangement for demodulation of the spectral wavelets in the frequency pace. Preferably, 10 (or more) discrete light sources 11$i$ are employed and modulated.

A frequency comb laser having suitable distance of the spectral lines in the spectrum is used, too, wherein each spectral line addresses a unique depth in the object space.

As compared to a tunable light source (so-called "swept sources"), the above-above-described imaging and measuring devices are advantageous in that the radiation of the complete addressed spectrum is in optical contact with the object at the same time. This results in an improved signal-to-noise ratio and higher flexibility as to parameterizing. A further advantage in signal processing resides in the massive parallelizability which is possible, e.g. thanks to the use of so-called smart cameras or graphic processors. Further, it is possible to use cameras having a relatively small number of pixels, which are, however, faster than cameras with a great number of pixels and allow for "real time" imaging, or measurements. This is particularly advantageous as compared to the solution known from document DE 10 2006 007 172 B4. The many possible encodings, together with suitable evaluation, further allow for discriminating a high number of spectral channels and for better adaptation to the specific application. Further, all the optical elements, e.g. curved diffraction gratings, DMDs, etc., can be used the best possible way with respect to their efficiency.

Further, the modulation frequency can have an inverse ratio, or be "inverted", with respect to the physical wavelength of the electromagnetic radiation. Thus, it is possible to modulate the spectral component with the shortest wavelength with both, the lowest modulation frequency and the highest modulation frequency. Accordingly, the modulation frequency can laterally "travel" across the SLM along the wave axis WM (from the lowest to the highest modulation frequency or vice versa). Variation of the modulation frequency can also be effected in accordance with the ratio of the wavelengths such that there is no need to convert (spread or compress) the spectrum. Variation of the modulation frequency can also be effected in accordance with the ratio of the wave numbers such that there is need to convert (spread or compress) the spectrum, either.

The above devices and methods can be employed in many fields of application. Two exemplary applications in the medical field are described in the following:

Example 1: Use of a Measuring Device According to the Invention as an Intraoral Handheld 3D Dental Camera with Chromatic-Confocal Approach An intense SLD illumination or a white-light laser are particularly well suited for use as light source, or radiation source (e.g. 440 nm-556 nm). Alternatively, a frequency comb laser with suitable distance of the spectral lines in the spectrum can be used as light source, or radiation source. Preferably, each spectral line addresses a unique depth in the object space. Preferably, an optical fiber is used to guide the light to a spatial light modulator (SLM) and/or to a chromatic-confocal measuring arrangement located in the object space. The SLM can, for example, be a 5 kHz DMDs. This allows for addressing and modulating 128, or even 256 spectral components or spectral channels in real-time.

Spot-light source illumination is effected with the modulated, or addressed, multispectral light in the object space of a chromatic-confocal measuring arrangement. The light reflected from the object (a tooth, or teeth is detected by means of a CCD camera, for example a 12 kHz-1 megapixel camera.

The 3D dental camera has a spectral imager rate of 16 Hz. This rate corresponds, for example, also to the rate of provision of the point cloud, or provision of the structural object information.

Preferably, the camera head is cast together with the chromatic-confocal 3D sensor (including the multispectral light source, the spatial light modulator, the chromatic-confocal measuring arrangement, and other optical components, if required), thus forming a 3D sensor head. Light is guided to the 3D sensor head using an optical fiber, for example.

The advantages of the above construction as compared to a conventional measuring arrangement with tunable light source ("swept-scan" measuring arrangement) are the improved anti-shake performance because more averaging over time is effected in the signal. A further advantage resides in the possibility to acquire 2D and 3D images in real-time.

Example 2: Application for Tumor Detection (Cancer)

For this application, an MIR continuum light source (e.g. having a spectrum within the mid-infrared range of about 7 μm to 11 μm wavelength range) can be used. Expressed in wave numbers, this corresponds to about 910 cm$^{-1}$ to 1430 cm$^{-1}$. A brilliant synchrotron radiation source of high spatial coherence can be employed in this case. An NIR (near-infrared spectrum) light source can also be used.

A predetermined (for example a relatively small) number of spectral components is addressed, or modulated, by means of a DMD suited for use the mid-infrared range as the spatial light modulator (e.g. DMD having gilded elements, pixels). From 2 to 16 spectral components can be addressed thereby. Preferably, the individual spectral components are narrow-band components and correspond to the "marker wavelength ranges" of the examined tissue that have been previously determined or that are generally known. All the wavelength ranges which have previously been determined to be irrelevant for tumor detection are preferably blanked by means of the DMD. Thereby, exposure of the examined tissue to a too high intensity of the electromagnetic radiation applied to and introduced into the tissue is reduced. On the other hand, the allowable intensity of electromagnetic radiation for the tissue can be used in the most accurate way by the wavelength ranges which are suited for yielding almost certainly significant information on the tissue to be examined. A spectrum of the illumination, "customized" for a specific medical problem can allow for advantageously reducing the time of measurement at the examined tissue without changing the signal-to-noise ratio.

The examined, potentially cancerous tissue (malignant) is optically contacted with the radiation spectrum addressed this way. From the detected spectral radiation components coming back, including the absorptions which have occurred in/at the tissue, the intensities in the corresponding "marker wavelength ranges" can be calibrated and set off against each other, e.g. by formation of quotients, variances, correlations of first to n-th derivative with respect to wave number/wavelength, etc., based on proven models. After that, calculation, evaluation and decision on the tumor characteristics are carried out. The examined tissue can, for example be classified as clearly benign (0), premalignant or clearly malignant (1). It is possible to represent the calculated images with a yes/no proposal in the individual camera pixels. Instead of displaying the individual spectral components, or the individual wavelengths, respectively by means of colors, the calculated cancer probabilities (e.g. clearly benign=0, premalignant, or clearly malignant=1) can be represented in the individual pixels of the displayed image. These can be displayed on a monitor in a grayscale encoded or a color encoded manner.

TABLE 1

List of Reference Signs with Descriptors

| Reference Numeral | Description |
|---|---|
| 10 | multispectral light source |
| 11i, i = 1, 2, ... | monochromatic or quasi-monochromatic light sources |
| 12 | diffraction grating |
| 14 | spatial light modulator (SLM) |
| 15 | SLM block |
| 18 | diffraction grating |
| 19 | device for high-resolution spectral splitting |
| 20 | control arrangement for frequency control of the individual spectral components (e.g. by means of controlling the spatial light modulator or the individual light sources) |
| 21 | synchronization connection |
| 22 | optical fiber |
| 24 | multispectral illumination beam bundle |
| 25 | operating table |
| 26 | object |
| 27 | patient |
| 28 | light reflected from the object |
| 30 | imaging optical system |
| 32 | camera |
| 34 | central computer (data processing unit), e.g. FFT, Lock-in evaluation |
| 36 | hyperspectral, or multispectral image (λ, x, y) |
| 37 | map of spatial distribution of different types of tissue |
| 38 | hyperspectral, or multispectral image (z, x, y) |
| 40 | chromatic-confocal measuring device |
| 42 | imaging lens |
| 44 | diffractive-optical element (DOE) for chromatic depth splitting |
| 46 | pixel-image formation system and confocal discriminator with imaging stage |
| 50 | illuminating device |
| 52 | mono-mode fiber |
| 53 | multi-mode fiber |
| 54, 58 | lenses collimator lense |
| 56 | rasterized, two-dimensional array of micro-lenses and pinholes assigned to the foci of the micro-lenses, respectively |
| 60 | beam splitter |

TABLE 1-continued

List of Reference Signs with Descriptors

| Reference Numeral | Description |
|---|---|
| 61 | interferometer beam splitter |
| 62 | diffractive optical element |
| 64 | imaging lens |
| 68 | mirror |
| 70 | light reflected from the object |
| 72 | second array of micro-lenses and pinholes assigned to the foci of the micro-lenses, respectively, with associated imaging stage for confocal discrimination (optionally) |
| 74 | prism |
| 76 | imaging optical system |
| 80 | spectrometric arrangement |
| 81 | object element |
| 82 | object element |
| 84 | reference mirror |
| 91 | pixel on camera 32 with image point from object element 81 |
| 92 | pixel on camera 32 with image point from object element 82 |
| 101 | wavelet associated to object element 81 |
| 102 | wavelet associated to object element 82 |

We claim:

1. A measuring device for distance measurement and/or for measuring a topography of an object by means of spectroscopy, the measuring device comprising:
a device for multispectral or hyperspectral imaging,
at least one of a chromatic confocal system or a chromatic triangulation system, wherein the device for multispectral or hyperspectral imaging comprises:
an illuminating device that generates multispectral or hyperspectral illuminating light having an addressable spectrum, the illuminating device comprising:
a multispectral light source;
a modulation device comprising a controller that is programmed and adapted to:
time-modulate individual spectral components of the multispectral light source with mutually different modulation frequencies, modulation frequency ranges, or modulation sequences, wherein each spectral component addresses a unique depth or depth range in the object space;
wherein
(i) the multispectral light source comprises at least one light source having a continuous spectrum, a quasi-continuous spectrum or frequency comb spectrum, and wavelength-dispersive element for spectral splitting of light emitted by the multispectral light source in a plurality of spatially separate spectral components each having different wavelengths or wavelength bands, and the modulation device comprises at least one electrically controllable spatial light modulator, wherein the controller is further programmed and adapted to time-modulate the individual spectral components in terms of time; or
(ii) the multispectral light source comprises at least an assembly or array of monochromatic or quasi-monochromatic light sources that emits light having emission wavelengths, or emission wavelength bands, differing from one another, and the modulation device comprises a plurality of electronic control modules assigned to the individual monochromatic or quasi-monochromatic light sources, and wherein the controller is further programmed and adapted to time-modulate the light emitted by the respective monochromatic or quasi-monochromatic light source; and
wherein the illuminating device further comprises optical elements, wherein the optical elements combine the individual, modulated spectral components of the multispectral light source such that they substantially spatially overlap each other so as to form the multispectral or hyperspectral illuminating light having an addressable spectrum;
an image acquisition device that acquires a sequence of two-dimensional images of the object illuminated with the multispectral light, the image acquisition device comprising at least one rasterized two-dimensional detector having a plurality of detector elements, wherein the plurality of detector elements detects at least part of the light coming from the object; and
an image evaluation device comprising at least one processor that causes the image evaluation device to:
perform a pixel-by-pixel analysis of the acquired sequence of two-dimensional images including:
determining shares of the individual spectral components in the detected light coming from the object via an analysis of time-variations of an intensity detected by each detector element; and
assigning the determined individual spectral components to depth or depth ranges of the object; and
generate a three-dimensional multispectral or hyperspectral image of the object on the basis of the determined depth or depth ranges.

2. The device according to claim 1, wherein the at least one processor causes the image evaluation device to:
for each detector element:
carry out a frequency analysis of time variation of the detected intensity, and
carry out a modulation wavelength conversion via an assignment of the determined modulation frequencies to at least one of a specific basic frequency, a specific basic frequency range, or a specific modulation sequence of individual spectral ranges.

3. The device according to claim 2, wherein the at least one processor causes the image evaluation device to perform at least one of a Fourier analysis, an FFT analysis, a wavelet analysis, or a lock-in detection of the intensity detected by each detector element; and further causes the image evaluation device to perform a correlation of the modulations determined on the basis of the detected intensity with the modulations of the spectral components performed by the modulation device.

4. The device according to claim 2, wherein the the modulation of the individual spectral components performed by the modulation device is synchronized with the image acquisition performed by the image acquisition device.

5. The device according to claim 3, further comprising a plurality of Fabry-Pérot filters for demodulating spectral wavelets in a frequency space.

6. A method for distance measurement and/or for measurement of a topography of an object, the method comprising:
generating multispectral light;
time-modulating, by a modulation device, individual spectral components of the multispectral light with modulation frequencies, modulation frequency ranges, or modulation sequences differing from each other, respectively, wherein each spectral component addresses a unique depth or depth range in the object space, wherein the generation of multispectral light comprises spectral splitting of the multispectral light in a plurality of spatially separate spectral components having mutually different wavelengths or wavelength bands, wherein the light is emitted by at least one of a continuous light source, a quasi-continuous light source, or a frequency comb light source; and time-modulation of individual spectral components is accomplished via an electrically controllable light modulator in terms of time;

combining the individual, modulated spectral components of the emitted light, such that they substantially spatially overlap each other so as to form the multispectral or hyperspectral illuminating light having an addressable spectrum;

illuminating the object with the multispectral or hyperspectral illuminating light having the addressable spectrum;

detecting a sequence of two-dimensional images of the illuminated object via a rasterized, two-dimensional detector having a plurality of detector elements, wherein the two detector elements detects an intensity of at least part of the light coming from the object;

performing a pixel-by-pixel analysis of the acquired sequence of two-dimensional images including:
  determining shares of the individual spectral components in the detected light coming from the object via a pixel-by-pixel analysis of a time-variation of the light intensity detected by each detector element; and
  assigning the determined individual spectral components to depth or depth ranges of the object; and
generating, based on the determined shares of the individual spectral components, a three-dimensional multispectral or hyperspectral image of the object on the basis of the determined depth or depth ranges.

7. The method according to claim 6, wherein
the time-modulation of the individual spectral components is periodic or aperiodic.

8. The method according to claim 6, wherein the time-modulation of the individual spectral components further comprises:
performing at least one of:
  a frequency-chirping;
  a variation of starting phases of the modulations of the individual spectral components;
  a linear change of the modulation frequency of the individual spectral components; or
  a time-variation of amplitudes of the modulations of the individual spectral components.

9. The method according to claim 6, wherein determining the shares of the individual spectral components further comprises:

carrying out a frequency analysis of the time-variations of the detected intensities; and carrying out a modulation-wavelength conversion via assignment of the determined modulation frequencies to at least one of a specific basic frequency, a specific basic frequency range, or a specific modulation sequence of the individual spectral ranges.

10. The method according to claim 6, wherein the determining the shares of the individual spectral components further comprises:
carrying out at least one of a Fourier analysis, an FFT analysis, a wavelet analysis, or a lock-in-detection of the intensity detected by each detector element; and
carrying out a correlation of the modulations determined on the basis of the detected intensity with the modulations of the individual spectral components carried out by the modulation device.

11. The method according to claim 6, further comprising:
synchronizing the modulation of the individual spectral components and the detection of the sequence of two-dimensional images.

12. The device according to claim 1, wherein the controller of the modulation device is further programmed and adapted to:
determine starting phases of the modulations of the individual spectral components differently, or to vary the same, respectively.

13. The device according to claim 1, wherein the time-modulation of the individual spectral components is periodic or aperiodic.

14. The device according to claim 1, wherein the modulation device performs frequency chirping, and wherein the modulation device performs time-variations of amplitudes of the modulations of the individual spectral components.

15. The device according to claim 1, wherein the modulation device linearly changes the modulation frequency of the individual spectral components.

16. The device according to claim 1, wherein the multispectral light source comprises:
  (i) a light source in a visible spectral range, an ultraviolet spectral range, an infrared spectral range, or in a Terahertz spectral range, or
  (ii) a synchrotron light source, particularly in a mid-infrared range.

17. The device according to claim 1, further comprising variable spectral filters that spectrally filter:
  (i) the light emitted by the light source having a continuous, a quasi-continuous, or a frequency comb spectrum, or
  (ii) the light emitted by the individual monochromatic or quasi-monochromatic light sources.

* * * * *